United States Patent
Kundu et al.

(10) Patent No.: US 10,853,856 B2
(45) Date of Patent: Dec. 1, 2020

(54) NOTIFICATION SYSTEM AND METHODS FOR USE IN RETAIL ENVIRONMENTS

(75) Inventors: Malay Kundu, Lexington, MA (US);
Joshua Migdal, Wayland, MA (US);
James Morrin, Brockton, MA (US);
Matthew Farrow, Canton, MA (US)

(73) Assignee: NCR Corporation, Atlanta, GA (US)

( * ) Notice: Subject to any disclaimer, the term of this patent is extended or adjusted under 35 U.S.C. 154(b) by 622 days.

(21) Appl. No.: 13/490,279

(22) Filed: Jun. 6, 2012

(65) Prior Publication Data

US 2012/0321146 A1  Dec. 20, 2012

Related U.S. Application Data

(60) Provisional application No. 61/493,705, filed on Jun. 6, 2011.

(51) Int. Cl.
| | |
|---|---|
| G06K 9/00 | (2006.01) |
| G06Q 30/06 | (2012.01) |
| G06Q 20/20 | (2012.01) |
| G07G 1/00 | (2006.01) |

(52) U.S. Cl.
CPC .......... *G06Q 30/06* (2013.01); *G06Q 20/202* (2013.01); *G06Q 20/208* (2013.01); *G07G 1/0036* (2013.01)

(58) Field of Classification Search
None
See application file for complete search history.

(56) References Cited

U.S. PATENT DOCUMENTS

| | | | | |
|---|---|---|---|---|
| 6,307,473 B1* | 10/2001 | Zampini et al. | ............ | 340/572.1 |
| 6,681,989 B2* | 1/2004 | Bodin | ............ | 235/383 |
| 6,738,749 B1* | 5/2004 | Chasko | ............ | G06Q 20/105 |
| | | | | 705/16 |
| 6,741,177 B2* | 5/2004 | Ballantyne | ............ | A47F 10/04 |
| | | | | 340/556 |

(Continued)

FOREIGN PATENT DOCUMENTS

EP  2290628 A1  2/2011

OTHER PUBLICATIONS

Image analysis for face recognition, Xiaoguang Lu, Dec. 14, 2010, pp. 1-37.*

(Continued)

*Primary Examiner* — Jayesh A Patel
(74) *Attorney, Agent, or Firm* — Schwegman Lundberg & Woessner

(57) ABSTRACT

Embodiments herein include novel ways of alerting store personnel when various activities, events, conditions, etc., occur at the checkout in retail establishments. For example, in accordance with one embodiment, the alerting can take place in substantially real-time, when the event occurs, allowing personnel to take appropriate measures, corrective or otherwise, to deal with the detected event. Examples of such events may include situations such as when a person of interest is detected as shopping at the store, when a cashier has missed scanning an item at the checkout, or to alert store personnel if a non-empty shopping cart has exited the store without payment (a.k.a., a cart push-out). Although the discussion below uses a grocery store as an example retail environment, embodiments herein can be used in any type of retail environment.

17 Claims, 13 Drawing Sheets

(56) References Cited

U.S. PATENT DOCUMENTS

| | | | |
|---|---|---|---|
| 7,100,824 B2* | 9/2006 | Ostrowski | G08B 13/1961 235/383 |
| 7,132,947 B2* | 11/2006 | Clifford et al. | 340/572.3 |
| 7,191,422 B1* | 3/2007 | Tourancheau et al. | 716/122 |
| 7,202,784 B1* | 4/2007 | Herwig | G06K 7/0008 340/10.1 |
| 7,337,960 B2* | 3/2008 | Ostrowski | A47F 11/10 235/383 |
| 7,385,522 B2* | 6/2008 | Belden, Jr. | A47F 5/0861 248/551 |
| 7,634,662 B2* | 12/2009 | Monroe | 713/186 |
| 7,769,207 B2* | 8/2010 | Olivo et al. | 382/115 |
| 8,040,231 B2* | 10/2011 | Kuruvila et al. | 340/506 |
| 8,195,499 B2* | 6/2012 | Angell et al. | 705/7.29 |
| 8,684,443 B2* | 4/2014 | Hara | B60R 19/48 296/97.22 |
| 8,694,443 B2* | 4/2014 | Bobbitt | G06N 99/005 706/12 |
| 8,746,557 B2* | 6/2014 | Connell, II | A47F 9/047 235/383 |
| 2002/0171548 A1* | 11/2002 | Ho et al. | 340/572.3 |
| 2003/0006098 A1* | 1/2003 | Wike, Jr. | A47F 9/046 186/61 |
| 2003/0018522 A1* | 1/2003 | Denimarck | G06Q 30/0267 705/14.23 |
| 2003/0040925 A1* | 2/2003 | Gutta | G08B 13/19602 348/143 |
| 2003/0048926 A1* | 3/2003 | Watanabe | G06K 9/00362 382/103 |
| 2003/0197782 A1* | 10/2003 | Ashe | G07G 1/14 348/150 |
| 2004/0049401 A1* | 3/2004 | Carr | G06Q 10/02 705/325 |
| 2004/0104930 A1* | 6/2004 | Stoler | G06Q 30/02 715/738 |
| 2004/0111324 A1* | 6/2004 | Kim | 705/22 |
| 2004/0117638 A1* | 6/2004 | Monroe | G08B 13/19682 713/186 |
| 2004/0164863 A1* | 8/2004 | Fallin et al. | 340/572.1 |
| 2004/0182650 A1* | 9/2004 | Harris et al. | 186/66 |
| 2005/0061874 A1* | 3/2005 | Mathewson, II | G07G 1/0054 235/383 |
| 2005/0189412 A1* | 9/2005 | Hudnut | G07G 3/003 235/383 |
| 2006/0064384 A1 | 3/2006 | Mehrotra et al. | |
| 2006/0175402 A1* | 8/2006 | Maitin | 235/383 |
| 2006/0187042 A1* | 8/2006 | Romer et al. | 340/572.1 |
| 2006/0227862 A1* | 10/2006 | Campbell | G06K 9/00778 375/240 |
| 2006/0243798 A1* | 11/2006 | Kundu | G06F 17/3241 235/383 |
| 2007/0094720 A1* | 4/2007 | Galambos | 726/9 |
| 2007/0176821 A1* | 8/2007 | Flom | G01S 7/412 342/25 A |
| 2007/0182557 A1 | 8/2007 | Stockton | |
| 2007/0182818 A1* | 8/2007 | Buehler | 348/143 |
| 2007/0278298 A1* | 12/2007 | Ali | 235/383 |
| 2007/0285513 A1* | 12/2007 | Arnold | 348/150 |
| 2008/0005036 A1* | 1/2008 | Morris | 705/64 |
| 2008/0018738 A1* | 1/2008 | Lipton | G06K 9/00771 348/143 |
| 2008/0114633 A1* | 5/2008 | Wolf | G06K 9/00771 705/7.29 |
| 2008/0278320 A1* | 11/2008 | Soto | G08B 13/248 340/541 |
| 2008/0283603 A1* | 11/2008 | Barron et al. | 235/454 |
| 2008/0303671 A1* | 12/2008 | Dinh et al. | 340/572.3 |
| 2008/0303902 A1* | 12/2008 | Romer | G07F 19/207 348/143 |
| 2008/0318678 A1* | 12/2008 | Stivoric | G06Q 30/0242 463/36 |
| 2009/0002172 A1 | 1/2009 | Hannah et al. | |
| 2009/0006286 A1* | 1/2009 | Angell | G06K 9/00771 706/12 |
| 2009/0039164 A1* | 2/2009 | Herwig et al. | 235/462.41 |
| 2009/0083122 A1 | 3/2009 | Angell et al. | |
| 2009/0090780 A1* | 4/2009 | Clark et al. | 235/462.01 |
| 2009/0097713 A1* | 4/2009 | DeLean | 382/115 |
| 2009/0115849 A1* | 5/2009 | Landers, Jr. | G07F 19/207 348/150 |
| 2009/0183177 A1* | 7/2009 | Brown | G06Q 10/10 719/318 |
| 2009/0207269 A1 | 8/2009 | Yoda | |
| 2009/0226099 A1* | 9/2009 | Kundu et al. | 382/224 |
| 2009/0236419 A1* | 9/2009 | Connell, II et al. | 235/383 |
| 2010/0002902 A1* | 1/2010 | Landers, Jr. | G06Q 20/202 382/100 |
| 2010/0059589 A1 | 3/2010 | Goncalves et al. | |
| 2010/0102961 A1* | 4/2010 | McCloskey | G08B 13/196 340/540 |
| 2010/0123003 A1* | 5/2010 | Olson et al. | 235/380 |
| 2010/0149305 A1* | 6/2010 | Catchpole | G06K 9/00288 348/14.08 |
| 2010/0217678 A1* | 8/2010 | Goncalves | 705/22 |
| 2011/0063108 A1* | 3/2011 | Aonuma | G06Q 20/4016 340/540 |
| 2011/0087535 A1* | 4/2011 | Yoshizawa | G06Q 20/20 705/14.26 |
| 2011/0119141 A1* | 5/2011 | Hoyos et al. | 705/17 |
| 2011/0131105 A1* | 6/2011 | Aonuma | G06Q 20/20 705/24 |
| 2011/0176005 A1* | 7/2011 | Kaneko et al. | 348/150 |
| 2011/0215147 A1* | 9/2011 | Goncalves | 235/383 |
| 2011/0257985 A1* | 10/2011 | Goldstein | G06F 16/3334 705/1.1 |
| 2012/0169879 A1* | 7/2012 | Libal | G06Q 10/063 348/150 |

OTHER PUBLICATIONS

Human detection using Depth and Gary images, Fengliang Xu et al., IEEE, 0-7695-1971, 2003, pp. 1-7 (Year: 2003).*

International Search Report, PCT/US2012/041126, dated Jan. 13, 2013, pp. 3.

Supplementary Partial European Search Report, EP12804711.

* cited by examiner

NOTIFICATION SYSTEM AND METHODS FOR USE IN RETAIL ENVIRONMENTS

RELATED APPLICATIONS

This application is related to and claims the benefit of earlier filed U.S. Provisional Patent Application Ser. No. 61/493,705 entitled "REAL TIME NOTIFICATION AT THE CHECKOUT," filed on Jun. 6, 2011, the entire teachings of which are incorporated herein by this reference.

BACKGROUND

Retail establishments commonly utilize point of sale or other transaction terminals, such as cash registers, to allow customers of those establishments to purchase items.

As an example, in a conventional department store, supermarket or other retail establishment, a customer collects items for purchase and places the items in a shopping cart, basket, or simply carries them to a point of sale terminal to purchase those items in a transaction. The point of sale terminal may be staffed with an operator such as a cashier who is a person employed by the store to assist the customer in completing the sales transaction. In some cases, retail establishments have implemented self-checkout point of sale terminals in which the customer is the operator and scans his items for purchase. In either case, the operator typically places items for purchase on a counter, conveyor belt or other item input area.

Point of sale terminals typically include a scanning device such as a laser or optical scanner system that operates to identify a Uniform Product Code (UPC) label or bar code affixed to each item that the customer desires to purchase. The laser scanner is usually a peripheral device coupled to a computer that is part of the POS terminal.

To scan an item, an operator picks up each item, one by one, from the item input area such as a conveyor and passes each item over a scanning area such as glass window built into the counter or checkout area to allow the laser scanner to detect the UPC code. After the point of sale computer identifies the UPC code of an item, the point-of-sale scanning terminal performs a lookup in a database to determine the price and identity of the scanned item. Alternatively, in every case where the operator can scan the item, the operator may likewise enter the UPC or product identification code into the terminal manually or through an automatic product identification device such as an RFID reader.

As the operator scans or enters each item for purchase, one by one, the point of sale terminal maintains an accumulated total purchase price for all of the items in the transaction. For each item that an operator successfully scans or enters, the point of sale terminal typically makes a beeping noise or tone to indicate to the operator that the item has been scanned by the point of sale terminal and in response, the operator places the item into an item output area such as a downstream conveyor belt or other area for retrieval of the items by the customer or for bagging of the items into a shopping bag. As well known, after all items in the transaction are scanned in this manner, the operator indicates to the point of sale terminal that the scanning process is complete and the point of sale terminal displays a total purchase price to the customer who then pays the store for the items purchased in that transaction.

These conventional systems that provide for purchase of items using an automated item identification systems such as a scanner suffer from a variety of deficiencies. In particular, operation of such systems can be compromised, either knowingly or unknowingly, by an operator in a manner that allows a customer to receive possession of one or more items without paying for them. For example, such scanning systems are susceptible to "pass-throughs," also know as "sweethearting" in which an operator purposefully or accidentally fails to scan an item as that item moves through the transaction area. In such cases, the POS system never detects the un-scanned item and the item is thus never totaled into the purchase price. Thus, the customer can receive one or more items for free. Retail chains lose millions of dollars a year due to operator error or fraudulent activity of this nature.

In a non-fraudulent example, an operator may unknowingly pass an item through the scanning area during a transaction and place the item into the item output area such as a downstream conveyor belt, but no scan of the item took place. It is possible that the operator was not paying close attention and did not notice (or did not care) that the scanner failed to beep during scanning of an item.

As an example of "sweethearting" that represents fraud on the retail establishment, an operator assists a customer who is personally known to the operator (e.g. a friend or conspirator of the operator). The scan operator intentionally passes the item over a scan window without the item being detected by the scanner.

One way to prevent proper scanning is to cover or block the UPC label as it is passes by the scanner's detection window. In such a situation, the item is included with other items that may or may not have also been scanned, and the customer or operator continues along with a transaction as if the item was properly scanned.

After the operator processes all items in the transaction, either via actual scanning which is often done for the less expensive items to make the transaction look legitimate to anyone who may be watching, or via sweethearting in which case the item not scanned is grouped with items that appear to have be scanned, the customer pays the operator a purchase price reflecting only the sum total of the scanned items. After paying, the customer leaves the store with all items, having only paid for those items that were properly scanned or entered into the POS system.

In another fraudulent example known as label switching, the operator causes the POS system to scan an item that is different that the item being passed through the scanning area during the transaction. In such cases, a customer or operator may replace a UPC label of an original and often expensive item with a UPC label for another less expensive item. In such cases, a scan takes place but the wrong item is identified by the POS system. In this manner, the system will scan the item for a price that is substantially lower that the value of the item received by the customer.

Security system designers have attempted to develop conventional techniques for detecting fraudulent or accidental operator error in use of POS terminals. The conventional systems in the field of detection of pass-through and sweethearting provide for the detection of abnormally long "scan-gaps". A "scan-gap" is the amount of time between consecutive scans at the point of sale terminal. When an item is passed through a scanner region without scanning, the scan-gap increases until the next scan. By comparing the scan-gaps between scanned items of a transaction versus the average scan-gap for a given employee operator, the conventional scan-gap method seeks to identify incidents when an item has bypassed the scanner without being scanned.

The conventional scan-gap detection method is widely regarded to be impractical, as scan-gaps have been found to be a "noisy" measure at best. This is due to the fact that perfectly legitimate scan-gaps may vary widely due to delays such as those caused by weighing of produce, manual entry of unlabeled or un-scannable goods, and rescanning of items that did not get scanned on the first pass. As a result, scan-gaps are not a dependable metric for determining improper activity. Thus, conventional systems that attempt to use scan gaps as a method for detecting fraudulent activity are prone to problems.

Other conventional systems include a surveillance camera to record an in-person sales transaction on video. In such an instance, the video can be reviewed at a later time in the store to determine whether there were any scan errors associated with a particular sales transaction.

BRIEF DESCRIPTION

In contrast to conventional techniques, embodiments herein include an analysis engine that monitors data generated in a retail environment. Based on the data, the analysis engine is able to identify a customer involved in a transaction. In response to detecting that the identified customer is included in a watch list, the analysis engine generates a notification indicating presence of the customer in the retail environment.

In accordance with further embodiments, the analysis engine monitors data generated in a retail environment. Based on an analysis of the data, the analysis engine identifies occurrence of a trigger event associated with a transaction in the retail environment. The analysis engine produces a preliminary alert based on the occurrence of the trigger event. The analysis engine transmits the preliminary alert to a remote processor for human validation. In response to validation of the preliminary alert by the remote processor, the analysis engine transmits a notification indicates occurrence of the trigger event in the retail environment.

In accordance with yet another embodiment, the analysis engine monitors a shopping cart in a retail environment. The analysis engine detects presence of the shopping cart in a predetermined area in the retail environment. In response to responsive to detecting presence of the shopping cart in the predetermined area in the retail environment, the analysis engine generates a notification indicating a cart pushout event.

These and other embodiments will be discussed in more detail below.

Embodiments herein can include a configuration of one or more computerized devices, workstations, handheld or laptop computers, or the like to carry out and/or support any or all of the method operations disclosed herein. In other words, one or more computerized devices or processors (such as a monitoring system, analyzer, etc.) can be programmed and/or configured to operate as explained herein to carry out different embodiments of the invention.

Yet other embodiments herein include software programs to perform the steps and operations summarized above and disclosed in detail below. One such embodiment comprises a computer program product that has a computer readable storage medium including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes computer readable storage media having instructions stored thereon for supporting operations such as those as described herein. The instructions, when carried out by a processor of a respective computer device, cause the at least one processor to: monitor data generated in a retail environment; identify a customer involved in a transaction based on the data; and in response to detecting that the identified customer is included in a watch list, generate a notification indicating presence of the customer in the retail environment.

Another particular embodiment of the present disclosure is directed to a computer program product that includes computer readable storage media having instructions stored thereon for supporting operations such as those as described herein. The instructions, when carried out by a processor of a respective computer device, cause the at least one processor to: monitor data generated in a retail environment; identify, based on an analysis of the data, occurrence of a trigger event associated with a transaction in the retail environment; produce a preliminary alert based on the occurrence of the trigger event; transmit the preliminary alert to a remote processor for validation; and in response to validation of the preliminary alert by the remote processor, transmit a notification indicating occurrence of the trigger event in the retail environment.

Yet another particular embodiment of the present disclosure is directed to a computer program product that includes computer readable storage media having instructions stored thereon for supporting operations such as those as described herein. The instructions, when carried out by a processor of a respective computer device, cause the at least one processor to: monitor a shopping cart in a retail environment; detect presence of the shopping cart in a predetermined area in the retail environment; and responsive to detecting presence of the shopping cart in the predetermined area in the retail environment, generating a notification indicating a cart pushout event.

Yet another particular embodiment of the present disclosure is directed to a computer program product that includes computer readable storage media having instructions stored thereon for supporting operations such as those as described herein. The instructions, when carried out by a processor of a respective computer device, cause the at least one processor to: monitoring a customer in a retail environment; detecting occurrence of a trigger event associated with the customer; in response to the trigger event: tracking a location of the customer in the retail environment; and depending on the location of the customer in the retail environment, activating an alarm.

Note that the ordering of the steps has been added for clarity sake; these steps can be executed in any suitable order.

Other embodiments of the present disclosure include software programs to perform any of the method embodiment steps and operations summarized above and disclosed in detail below.

Also, it is to be understood that the embodiments herein can be a software program, a combination of software and hardware, or as hardware alone. Example embodiments of the invention may be implemented within computer systems, processors, and computer program products and/or software applications manufactured by Stoplift, Inc. of Cambridge, Mass., USA.

As discussed above, techniques herein are well suited for use in point-of-sale transaction such as those in which an agent scans a respective item at checkout. However, it should be noted that embodiments herein are not limited to use in such applications and that the techniques discussed herein are well suited for other applications as well.

Additionally, although each of the different features, techniques, configurations, etc., herein may be discussed in different places of this disclosure, it is intended that each of the concepts can be executed independently of each other or, where suitable, in combination with each other. Accordingly, the one or more present inventions as described herein can be embodied and viewed in many different ways.

This brief description of the disclosure does not specify every embodiment and/or incrementally novel aspect of the present disclosure or claimed invention(s). Instead, this brief description of embodiments herein only provides a preliminary discussion of different embodiments and corresponding points of novelty. Thus, the detailed description includes a further summary of the invention(s). For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FURTHER SUMMARY AND DETAILED DESCRIPTION OF EMBODIMENTS

Embodiments herein include novel ways of alerting store personnel when various activities, events, conditions, etc., occur at the checkout in retail establishments. For example, in accordance with one embodiment, the alerting can take place in substantially real-time, when the event occurs, allowing personnel to take appropriate measures, corrective or otherwise, to deal with the detected event. Examples of such events may include situations such as when a person of interest is detected as shopping at the store, when a cashier has missed scanning an item at the checkout, or to alert store personnel if a non-empty shopping cart has exited the store without payment (a.k.a., a cart push-out). Although the discussion below uses a grocery store as an example retail environment, embodiments herein can be used in any type of retail environment.

These and other embodiments are discussed in more detail below.

Figure 1:
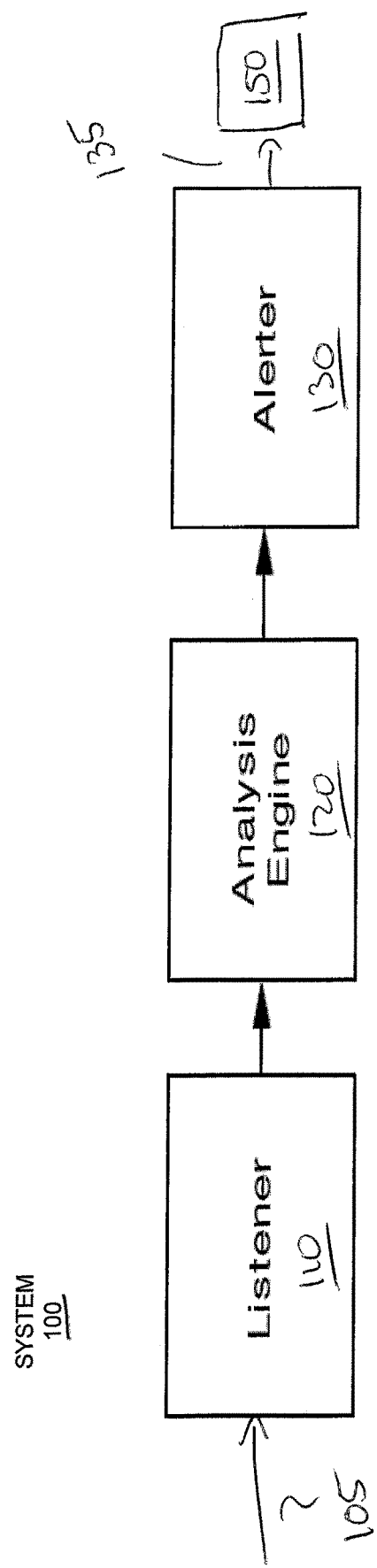
FIG. 1 is an example diagram of a monitoring retail system providing alerts according to embodiments herein.

More specifically, FIG. 1 is an example diagram of system 100 according to embodiments herein.

As shown, system 100 can include three components: a listener 110, an analysis engine 120, and an alerter 130.

In one embodiment, the listener 110 is integrated with the retail environment to receive data from the retail environment. The listener 110 can receive data one or more data feeds 105 produced in the retail environment. The listener 110 passes the data feeds to the analysis engine 120. The data feeds 105 can include any suitable type of feed such as a video data, point of sale (POS)data, etc.

As its name suggests, the analysis engine 120 analyzes the data received from the listener 120. In one embodiment, the analysis engine 120 identifies occurrence of specific patterns, events, activities of interest (AOI), etc. Upon detection of a respective event (i.e., activity of interest, pattern, etc.), the analysis engine 120 sends an appropriate alert to the alerter 130. The alerter produces notifications 135 (e.g., alerts, commands, messages, etc.) to one or more recipients.

Embodiment #1

Watch List

In one embodiment, the analysis engine 120 is capable of looking for a variety of AOIs. For instance, the analysis engine 120 can be configured to retrieve and/or analyze specific types of data in the data feeds 105 to detect customer identifier information. For example, transaction data from one or more feed can include transaction log information (e.g., point of sale data) indicating the items scanned a terminal. The transaction data from one or more feeds 105 also can include images of the transaction as captured by monitor devices. In accordance with one embodiment, based on customer identifier information (e.g., in or derived from the one or more different types of feeds 105), the analysis engine 120 is able to detect when particular customers of interest are shopping in a respective retail environment.

In accordance with further embodiments, unique information to identify a customer can be found within the feeds 105 themselves. In such an instance, the analysis engine 120 can be configured to analyze data from one or more feeds 105 in order to produce customer identifier information.

More specifically, in accordance with one embodiment, the system 100 can be configured to monitor data generated in a retail environment via feeds 105. In such an embodiment, assume that the system 100 identifies a customer involved in a transaction based on the monitored data. In response to detecting that the identified customer is included in a watch list, the system 100 generates a notification indicating presence of the customer in the retail environment.

The transaction monitored by system 100 can be a retail transaction such as one in which the customer purchases one or more items selected form the retail environment. Prior to the customer exiting the retail environment, the system 100 can be configured to automatically transmit the notification to a resource such as retail personnel (e.g., an employee in the retail environment, store personnel, remotely located persons outside of the retail environment, etc.). Accordingly, retail personnel can be notified when a person of interest is in or exiting the retail environment.

The watch list can includes identities of multiple different customers of interest. Each of one or more customers of interest on the watch list may be included in the watch list based on a previous history of behavior of interest. For example, if a customer has been previously identified (by such other systems as provided by StopLift, Inc.) of committing larceny or other bad behavior in the retail environment, the customer may be added to the watch list; if a customer typically has trouble operating a self-checkout lane in the retail environment, the person can be added to the watch list; if the person ha such as criminal record, the person can be included on the watch list; and so on.

In one embodiment, the system 100 monitors data generated in the retail environment such as point of sale data. A respective checkout terminal in the retail environment can produce the point of sale data as a customer purchases one or more items obtained in the retail environment. During the sales transaction, the customer can input personal or unique information to the checkout terminal. The personal information can be any information such as information from a customer loyalty card assigned to the customer, a credit card used by the customer, etc. The system 100 processes the personal information to determine an identity of the customer. As mentioned above, if the identified customer happens to be included in the watch list, the system 100 can send a notification to one or more appropriate parties. In one embodiment, the alerter of system 100 transmits the notifications to a device 150 (e.g., a communication device, an alarm system, etc.) in the retail environment. The device 150 can be mobile or stationary depending on the embodiment.

In accordance with further embodiments, the system 100 can be configured to identify the customer based on an analysis of items purchased by the customer during the transaction. In many instances, a customer may be in the habit of purchasing the same items each time they are in a store.

In addition to, or as an alternative to monitoring point of sale data generated during a transaction, the system 100 can be configured to monitor images captured by cameras located in the retail environment. For example, the system 100 can monitor video data of a respective point of sale transaction. The video data can include images of the customer during the sales transaction. Via the image information, and application of one or more facial recognition algorithms to the images, the system 100 can be configured to identify the identity of a respective customer.

As a more specific example, the system can perform a facial analysis of the at least one images captured during a transaction to identify a customer. Based on the facial analysis, the system 100 whether the identified customer is included in the watch list. The system 100 can attempt to match an image in a received feed to an image stored in the watch list to detect a customer.

In accordance with yet further embodiments, the system 100 can transmit the notification to a device 150 such as an alarm system in the retail environment. The notification causes the alarm system to produce an alert to at least the customer in the retail environment. In other words, the alarm system can activate a visual alarm, audible alarm, etc., in the retail environment to provide notification to the customer on the watch list such that the retail personnel are aware of his/her presence. In such an instance, the customer may be less likely to commit bad behavior (such as stealing merchandise) from the retail environment.

The device 150 can be a pedestal alarm system designed to simulate the appearance and operation of an EAS (Electronic Article Security) pedestal. The alarm can be activated depending on movement of the customer through the retail environment. For example, it may be determined in advance that the customer on the watch list happens to be in the retail environment. The EAS-style pedestal can be located at an egress of the retail environment. The location of the customer can be tracked via system 100. The alarm (such as a EAS style pedestal or other alert system) can be activated when the customer is in a vicinity of the alarm system. If the customer exits the retail environment, the customer can be notified to discontinue exiting the retail environment via activation of the alarm.

As mentioned, the system 100 can be configured to transmit the notification (e.g., message, command, etc.) to any suitable type of resource in the retail environment. For example, the system 100 can transmit the notification (indicating presence of the identified customer) to a particular person, a particular department, a member of security personnel in the retail environment, a remote video analyst, device 150, etc.

The notification can be produced in accordance with any suitable format. For example, the system 100 can be configured to generate the notification as an SMS text message, an e-mail message, a command activating an alarm system located at an exit of a store alerting exiting customers of a potential security breach associated with the transaction, a notification indicating to an employee in the retail environment to pay attention to the customer in a self-checkout lane, a customer service notification indicating to an employee in the retail environment to provide assistance to the customer in a self-checkout lane, a command to halt a current transaction to which the customer is a party, an alert message directed to a point of sale system, an alert message directed to a self-checkout, etc.

The system 100 can produce the notification to include any type of suitable information such as symbols, text, graphics, a link to remotely available data, video data, etc.

In yet further embodiments, the system 100 can be configured to identify a cashier involved in the sales transaction in addition to a customer involved in the sales transaction. The watch list accessible to the system 100 can include pairings of persons to monitor in the retail environment. For example, in response to detecting that a combination of the identified cashier and the identified customer are participants in the transaction, and that the pairing of such persons is specified in the watch list, the system 100 generates and transmits a respective notification to alert appropriate retail personnel (of the corresponding retail transaction).

Thus, embodiments herein can include system 100 that identifies a grouping of multiple parties involved in a transaction based on data received from one or more feeds 105, the data indicates: i) a customer purchasing at least one item and ii) a store representative facilitating the transaction. Responsive to detecting that a combination or pair including the customer and the store representative is specified in the watch list of the retail environment, the system 100 generates a notification to alert retail personnel or activate a public alarm in the retail environment.

In one embodiment, the store representative is a self-checkout assistant cashier overseeing a self-checkout lane used by the customer that appears to be purchasing one or more items.

Note that the transactions as discussed herein can occur in any suitable location in the retail environment. For example, the transactions monitored by the system 100 can occur in a self-checkout lane in the retail environment; the transactions monitored by the system 100 can occur in a manned-checkout lane in the retail environment; the transactions monitored by the system 100 can occur using a mobile checkout device; etc.

These and more specific embodiments are further discussed below with respect to additional figures.

Embodiment #2

Multi-Stage Alert Processing

In accordance with one embodiment, the system 100 monitors data generated in a retail environment. Based on an analysis of the data, the system 100 identifies the occurrence of a trigger event associated with a sales transaction in the retail environment. The system 100 produces a preliminary alert based on the occurrence of the trigger event, condition, etc. There may be a degree of uncertainty that the trigger event, condition, etc., occurred because the analysis engine 120 may be inaccurate. The system 100 transmits the preliminary alert to a remote processor for validation. The remote processor can include a human reviewer that produces the validation of the preliminary alert. In response to validation of the preliminary alert by the remote processor, the system 100 produces and transmits a notification to one or more target destinations located internal or external with respect to the retail environment. The notification can include information indicating the occurrence of the trigger event in the retail environment.

As mentioned, the data monitored by the system 100 can include video data capturing images of a customer obtained during the transaction. Thus, aspects of the transaction can be visually and/or audibly recorded. The validation of the preliminary alert can occur substantially in real-time around a time during which a customer leaves the retail environment with at least one item obtained or collected from the retail environment. Thus, the validation of the preliminary alert produced by the system 100 can occur: prior to a customer in the transaction exiting the retail environment but after the customer takes possession of at least one retail item during the transaction. The customer can be considered to take possession of the one or more items (without the intent to necessarily pay for such items) at any time. In one embodiment, the customer can be considered as taking possession of the one or more items such as after passing a checkout lane but before exiting the retail environment. At such point, it may be clear that the customer has no intention of paying for a respective retail item.

The preliminary alert produced by the system 100 can occur after recording (e.g., scanning) of a first retail item in the transaction. Validation of the preliminary alert may be so fast that validation of the preliminary alert occurs prior to recording (e.g., scanning, manual entry, reading of RFID tag, etc) of a second retail item in the transaction.

In accordance with further embodiments, validation of the preliminary alert occurs prior to completion of the transaction. Completion of the transaction can include completion of scanning items, payment of one or more items in the transaction, occurrence of the customer leaving a checkout lane to exit the retail environment, etc. Thus, in one embodiment, the validation of the preliminary alert can occur prior to a customer in the transaction leaving the retail environment.

In one embodiment, the trigger condition on which the system 100 generates the preliminary alert can be based on detection of suspicious activity. The system 100 transmits the notification to retail personnel responsible for addressing suspicious activity in the retail environment.

The analysis engine 120 can be configured to analyze the one or more feeds 105 (e.g., video feeds and corresponding POS data stream feeds) to detect an event such as when items are not properly scanned by a cashier. This type of event is typically called sweethearting or scan-avoidance.

In another embodiment, the trigger event may be detection of a customer in need of help in the retail environment. The system 100 transmits the notification to retail personnel responsible for customer service in the retail environment.

Thus, the trigger event detected by the system 100 can be: detection of customer distress at a checkout lane in which a customer needs help during the transaction, detection of improper recording or scanning of retail items for purchase during the transaction, detection of a presence of a shopping cart in a predetermined location of the retail environment, detection of retail items in the shopping cart that have not been recorded during the transaction, detection that an identity of a customer in the transaction is on a watch list, etc.

In one embodiment, the system 100 monitors video of a predetermined location such as an egress path (e.g., checkout lane bypass path) avoiding checkout lanes in the retail environment. The trigger event can be presence or passing of a person, shopping cart, etc., through or near a vicinity of the predetermined location of interest being monitored As mentioned, the system 100 can be configured to transmit the preliminary alert to a remote processor over a network. In one embodiment, the system 100 transmits video information capturing images of the transaction to the remote processor for review. Additionally, the system 100 transmits point of sale transaction information (e.g., transaction log data) related to the transaction to the remote processor. The remote processor can include a human reviewer that reviews the video information and the point of sale transaction information to determine whether the preliminary alert of the detected is valid or not. In other words, the remote processor analyzes the images and sales information to determine whether the detected event is valid. If so, the remote processor provides feedback to system 100 indicating that the preliminary alert is valid.

Validation according to embodiments herein can further include validating the transaction of any portion thereof. For example, embodiments herein can include flagging detection of a shopping cart in a retail environment via generation of a respective preliminary alert for each cart. The system 100 can be configured to generate the preliminary alert. The remote processor can validate the transaction. That is, the remote processor site can provide feedback to the system 100 whether or not a there was, for example, suspicious activity associated with the transaction. If so, the system 100 generates a notification to perform any of the different possible functions as discussed herein (e.g., notify personnel, activate an alarm, notify the customer, provide a visual indication, etc.).

In accordance with further embodiments, the detected event can be an event that is not necessarily suspicious. For example, the retail environment can include a monitor to detect occurrence of opening of a door. In such an instance, the system 100 can generate a preliminary alert that a respective door in the retail environment was opened. The preliminary alert produced by the system 100 as well as corresponding images taken of activity taking place with respect to the door can be sent to the remote processor site for further review by a human reviewer. Thus, the human reviewer can review the activity in substantially real-time or slightly delayed. The human reviewer can provide feedback to the system 100 whether or not personnel in the retail environment need to be dispatched to stop the activity, further monitor the activity, etc.

Note that the system 100 or portion thereof, such as the analysis engine 120, can be located in the retail environment. As its name suggests, the remote processor (e.g., reviewer, playback equipment, etc.) can be located at a remote location with respect to the retail environment or the system 100. The remote reviewers at the remote location can be trained to view the video and/or point of sale data logs to determine whether the preliminary alert is proper. For example, the analysis engine 120 can be configured to review the received image information and/or point of sale data. The analysis engine 120 generates the preliminary alert if it is determined that an event may have occurred. The system 100 transmits the recorded transaction data (e.g., image information and point of sale data associated with the transaction) to the remote processor for human review. The remote processor reviews the recorded transaction data to determine whether the preliminary alert is valid.

The preliminary alert produced by the analysis engine 120 can include information specifying the type of event that was thought to occur. The remote reviewers can use the preliminary alert as a basis to identify what to look out for in the recorded transaction data received over the network. For example, the preliminary alert may specify that an event occurred such as sweethearting, customer in distress, cart pushout, etc.

A human at the remote processor validates the preliminary alert in response to detecting a condition such as that at least one item possessed by a customer as indicated by respective video information was absent from the point of sale transaction information. In other words, the human reviewer at the remote location can view the image information in view of the point of sale data to determine whether an item is present in a scanning region of a point of sale terminal and whether the item passing the scanning region is properly scanned. The transaction information sent to the remote reviewer can include markings indicating when items in a transaction log are properly scanned.

In further embodiments, the system 100 can generate the notification to include information indicating one or more items that were absent from the scan log data. The system 100 transmits the notification to a target destination such as retail personnel in the retail environment.

If desired, the system 100 transmits the notification of the detected trigger event to a checkout station (e.g., point of sale terminal used to purchase items) in the retail environment to halt the transaction. Receipt of the notification (e.g., a command in this instance) at the checkout station prevents the customer or corresponding cashier from completing a transaction. An audible, visual alarm, etc., can be activated at the checkout lane to draw attention in the retail environment to the halting of the transaction.

In accordance with one embodiment, the system 100 can be configured to transmit the notification to a device 150 such as an alarm system in the retail environment to produce an audible alarm to a customer associated with the transaction. The audible alarm can be part of an alarm system that is designed to look and operate like an EAS (Electronic Article Surveillance) system. The EAS system can be located at an egress of the retail environment or any other suitable location.

In yet further embodiments, the system 100 can generate the notification to include information indicating, for example, that a customer needs assistance associated with the transaction.

The remote processor can have access to a watch list. In such an embodiment, the remote processor such as a human reviewer validates the preliminary alert based on detecting that a customer associated with the transaction is included in the watch list.

The remote processor (e.g., centralized or distributed) can be configured to validate the preliminary alert based on at least one of: crowd sourcing, a facial recognition engine, calling in to a web service, etc.

The notification produced by the system 100 can be any suitable type of message such as: an SMS text message, an e-mail message, a command activating an alarm system located at an exit of a store alerting exiting customers of a potential security breach associated with the transaction, a customer service notification indicating to an employee in the retail environment to provide assistance to the customer in a self-checkout lane, a security notification indicating to retail personnel in the retail environment to address suspicious activity at a checkout lane, a command to halt the transaction, an alert message directed to a point of sale system, an alert message directed to a self-checkout lane, etc.

The trigger condition or event detected by the system 100 to produce the preliminary alert can be a suspicious activity. In such an instance, the system 100 transmits the notification to retail personnel responsible for addressing suspicious activity in the retail environment.

These and more specific embodiments are further discussed below with respect to additional figures.

Embodiment #3

Cart Pushouts

In yet further embodiments, the analysis engine 120 can be configured to monitor received data feeds to identify occurrence of events such as cart push-out events. As an example, a cart-pushout event refers to an event in which a respective customer pushing a shopping cart leaves (or attempts to leave) a retail environment without paying for one or more present in the shopping cart.

Applicants note that shopping cart as discussed herein refers any type of resource (e.g., basket, container, bag, etc.) to convey one or more retail items around and/or out of the retail environment.

In accordance with such an embodiment, the system 100 monitors a shopping cart in a retail environment. Assume that the system 100 detects presence of the shopping cart in a predetermined area in the retail environment. Responsive to detecting presence of the shopping cart in the predetermined area in the retail environment, the system 100 generates a notification indicating a cart pushout event.

The system 100 can generate the notification based on any of one or more different circumstances. For example, in one embodiment, the system 100 generates the notification to one or more target recipients in response to detecting that the shopping cart fails to pass through and checkout items in a checkout lane of the retail environment.

In accordance with another embodiment, the system 100 generates the notification in response to detecting that at least one item in the shopping cart was not properly recorded for purchase as the shopping cart exits the retail environment.

In the case of detecting a cart pushout event, the system 100 transmits the notification to retail personnel. The notification can instruct the retail personnel to verify proper purchase of items present in the customer's shopping cart.

The system 100 can monitor any suitable one or more predetermined locations on the retail environment. In one embodiment, the predetermined area visually monitored by the system 100 in the retail environment includes an exit path (e.g., egress) out of the retail environment. The exit path can be a bypass path used by customers exiting the retail environment to bypass the checkout lanes. Typically, shopping carts should not be exiting the retail environment without passing through a checkout lane. Thus, presence of a shopping cart in a bypass lane may be very suspicious, indicating a likelihood of a larceny or some other improper event. The system 100 generates the notification as the shopping cart exits the retail environment in response to detecting that the shopping cart fails to pass through a checkout lane of the retail environment.

The system 100 can be configured to monitor the shopping cart based on analyzing video data capturing at least one image of the shopping cart in the predetermined area. Based on analyzing at least one image of video data, the system detects whether the shopping cart includes retail items. Shopping carts exiting retail environment via a bypass lane normally would not include retail items.

The system 100 can analyze captured images of the shopping cart in substantially real-time or slightly delayed to detect that the shopping cart passes through the predetermined area in the retail environment. The system 100 can generate and transmit the notification to the retail personnel sufficiently fast such that the retail personnel are notified of the cart pushout prior to the shopping cart passing through an exit, doorway, threshold, etc., of the retail environment.

In yet another embodiment, the system 100 analyzes received video data in conjunction with analyzing received transaction logs. The received video data captures images of the shopping cart. The received transaction logs indicating items purchased by customers in the retail environment. The system 100 generates the notification of the cart pushout event in response to detecting absence of a transaction associated with the shopping cart. Thus, if images of a shopping cart indicate that a shopping cart is in a predetermined area (such as a checkout lane or bypass lane) and there was no transaction log of items being scanned for purchase, the system 100 can generate a notification of the cart pushout event. In such an instance, the system 100 can generate the notification in response to detecting: i) presence of at least one item in the shopping cart, and ii) that the shopping cart passed through the predetermined area.

In accordance with yet further embodiments, the predetermined area monitored by the system 100 can be a checkout lane for purchasing items in the retail environment. The system 100 generates the notification based at least in part in response to detecting that the shopping cart passes through the checkout lane without generation of a corresponding transaction log indicating that an item was purchased. Thus, the system 100 can generate notification of a cart pushout event if a shopping cart passes a monitored checkout lane and there was no transaction log (e.g., point of sale data) generated for the shopping cart as it passed by a respective point of sale terminal. Thus, embodiments herein can include a system 100 that generates the notification based at least in part in response to detecting that a point of sale terminal in the checkout lane does not generate a transaction around a time of the shopping cart passing through the checkout lane.

The system 100 is not limited to monitoring one or more shopping carts attempting to leave the retail environment via an egress. Further embodiments herein include a system 100 configured to monitor an ingress of the retail environment and generate one or more notification in response to detecting that the shopping cart attempts to leave the retail environment via an ingress pathway normally used by customers to enter the retail environment.

In accordance with yet further embodiments, in addition to or as an alternative to monitoring a predetermined location in the retail environment, the system 100 can be configured to track a path of a shopping cart with respect to checkout lanes in the retail environment. One or more notifications can be generated based on detection of events as discussed herein.

In one embodiment, the system 100 transmits the notification (e.g., a command in this instance) to an audible and/or visible alert system or alarm system. The notification triggers an alarm or alert notifying the customer pushing the shopping cart, as well as retail personnel in the vicinity, of the cart pushout event. Thus, a customer performing the cart pushout can be notified that the personnel in the retail environment are aware of the cart pushout event.

Embodiment #4

Alarm

In accordance with another embodiment, the system 100 monitors a customer present in a retail environment. The system 100 detects occurrence of a trigger event associated with the customer. In response to the trigger event, the system 100: tracks a location of the customer in the retail environment; and depending on the location of the customer in the retail environment, activates a respective alarm. Device 150 can be an alarm that is activated depending on one or more commands generated by the system 100. The alarm can be located at any suitable location in the retail environment.

The system 100 can detect any type of suitable trigger event. For example the trigger event can be any of the following types: a cart pushout event, a scan avoidance event, improper recording of at least one retail item for purchase during a respective sales transaction (i.e., scan avoidance), detection of a presence of a shopping cart in a predetermined location of the retail environment, detection of retail items in the shopping cart that have not been recorded during a respective sales transaction, detecting that an identity of the customer in the transaction is on a watch list, the trigger event can be suspicious activity associated with one or more customers in the retail environment, etc.

Detection of any of these types of events can cause the system 100 to track one or more participants of the detected event. For example, the system 100 can detect a scan avoidance event by a customer. In other words, the customer can avoid scanning of one or more items (e.g., via sweethearting, improper use of self-checkout, cart pushout, etc.) as he leaves or attempts to leave the retail environment. In such an instance, the system 100 monitors a path taken by the customer on an egress pathway of the retail environment extending from a vicinity of the point of sale terminal to an exit of the retail environment. The system 100 can be configured to activate the alarm at a time when the customer is located at a predetermined location in a vicinity of the exit. The predetermined location can be one or more particular locations in the retail environment. Activation of the alarm notifies the customer to halt (i.e., discontinue exiting the retail environment). At such time, retail personnel can confront the customer and determine whether the customer possesses stolen merchandise, accidentally mis-scanned items, etc.

As mentioned, in one embodiment, the system 100 activates an alarm (e.g., an EAS-style alarm located at an exit of the retail environment, an alarm at a point of sale terminal, etc.) in response to detecting that the customer is in a vicinity of a predetermined location in the retail environment. The predetermined location such as a exit may be located in an egress pathway of the retail environment. In other words, the system 100 can detect when the customer is in a location near the exit of the retail environment. In this instance, the system 100 activates the alarm to notify the customer (and potentially any other persons in the retail environment) that there is an issue with the customer requiring further inquiry or attention.

Monitoring of the retail environment and/or customer in the retail environment can include analyzing scanning information (e.g., point of sale data indicating items scanned during a sales transaction, etc.) as well as analyzing one or more images (e.g., video) produced during the sales transaction in which the customer purchases at least one retail item obtained in the retail environment. In accordance with such an embodiment, the sales transaction can occur at a point of sale terminal in the retail environment. Monitoring equipment such as cameras, recorders, etc., can be configured to capture images of the sales transaction analyzed by the system 100 or remote processor site.

The system 100 can include electronic devices to detect the trigger condition. In accordance with other embodiments, the system 100 can transmit image information (e.g., one or more images) of the customer to a remote processor site. The remote processor site can include one or more human reviewers that review the image information and potentially corresponding point of sale transaction data. Based on input from one or more human reviewer in the remote processor site, the system 100 can receive a notification indicating the occurrence of the trigger event. The remote processor site may be located in a first country or location, for example, India while the retail environment being monitored may be located in a second country or location such as Canada.

The alarm that is activated by the system 100 can be an EAS style alarm. For example, the alarm system can be located near an exit of the retail environment. The alarm may be an audible alarm (e.g., sound), a visual alarm (e.g., light, display screen, etc.), etc. In one embodiment, the system 100 initiates a command to activate the alarm to alert the customer that the event occurred. However, because of the tracking, the system 100 does not immediately activate the alarm. Instead, as mentioned, the system 100 activates the alarm based on a location of the customer.

Further embodiments herein include monitoring one or more events in a region of the retail environment between the checkout lanes and a respective exit (e.g., door, threshold, parking lot, etc.). The trigger event can occurs any between a time when the customer is in a vicinity of a check lane (or on a path en route to the checkout lane) of the retail environment and the exit of the retail environment. The system 100 can be configured to validate the occurrence of the trigger event after entering a checkout lane and prior to a time when the customer exits the retail environment. As mentioned, subsequent to receiving a signal validating that the trigger event is proper or that the event necessitates further in-person attention by retail personnel, the system 100 generates an appropriate one or more notifications to address the event.

The system 100 can detect occurrence of the trigger event by detecting that the customer is included on a watch list.

In accordance with further embodiments, the system 100 can include a human reviewer that detects the event. Subsequent to the trigger event, the human reviewer can be notified to track the location of the customer in the retail environment. The human reviewer can activate the alarm depending on the location of the customer in the retail environment.

These and more specific embodiments are further discussed below with respect to additional figures. For example, more details of different versions and implementations of system 100 and respective functionality are further described below.

Applicants further note that there are many other activities and embodiments of the analysis engine 120 and related functions in the system 100. The previous examples should not be interpreted as being an exhaustive list.

By way of a non-limiting example, upon receiving a real-time alert of an AOI (i.e., activity of interest) in progress as generated by the analysis engine 120, the alerter 130 takes appropriate action. As discussed in further detail below, taking appropriate action in response to detecting an event can include sending out SMS/text messages to appropriate recipients, sending out emails to registered recipients, communicating with a POS system in the retail environment, signaling an EAS-like pedestal to sound an alarm, providing real-time validation of an AOI, etc.

Figure 2:
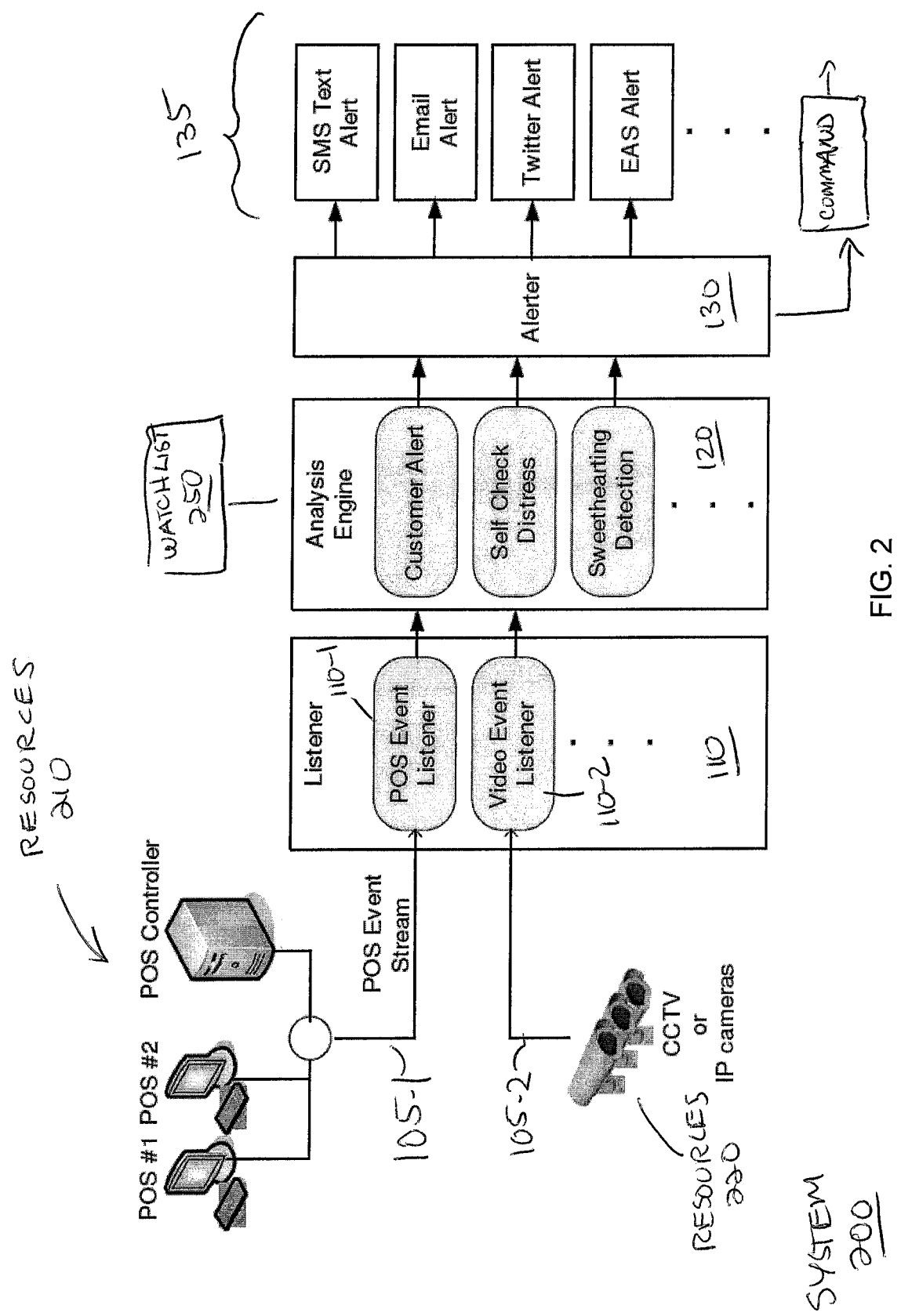
FIG. 2 is a more detailed example diagram of a monitoring retail system for providing alerts according to embodiments herein.

FIG. 2 is an example diagram illustrating a system 200 according to embodiments herein. As shown, the system 200 (e.g., a more detailed version of system 100) can include listener 110 that monitors feeds 105 in real-time or substantially real-time.

In this specific example, the listener 110 includes POS event listener 110-1 and the video event listener 110-2. The POS event listener 110-1 receives POS event stream 105-1.

The POS event stream 105-1 can include point of sale type data generated by point of sale resources 210 (e.g., cash register, scanner, etc.) in the respective retail environment being monitored.

The video event listener 110-2 receives a data feed 105-2 (e.g., video images, etc.) from monitor resources 220. In one embodiment, the monitor resources 220 (e.g., video cameras, video storage systems, image generators, etc.) produce images of events such as purchase of items, scanning of items, non-scanning of items passing through a scanner region of point of sale resources 210 (e.g., checkout lanes including point of sale terminal #1, point of sale terminal #2), shopping carts leaving the retail environment, etc. Each point of sale terminal #1, point of sale terminal #2, etc., can include a respective optical scanner to scan items for purchase. The scanner detects unique information (e.g., a bar code) associated with the item. Based on which items are scanned, the respective point of sale terminal keeps track of a total purchase price for the items. (The term "scanned" or "recorded" is being used more generally to include optical scanning, manual entry of the bar code or SKU number, reading of an RFID tag, etc.)

The feeds 105 (and possibly other feeds) are transmitted to analysis engine 120. As its name suggests, analysis engine 120 analyzes the data for specific Activities of Interest (AOI) (i.e., events). In one embodiment, subsequent to detection of an event or activity of interest, the analysis engine 120 communicates detection of one or more different events, activities, etc., to the alerter 130. The analysis engine 120 receives and processes notification of the detected events generated by the analysis engine 120.

In this example, based on the detected events as indicated by the analysis engine 120, the alerter 130 sends out one or more notifications 135 (e.g., messages, commands, signals, etc.) in one or more different formats, protocols, etc., for each detected event. For example, as shown, the alerter 130 can be configured to transmit an alert via SMS messaging, emails, alerts targeted to specific Twitter™ accounts, etc., depending on who is registered to receive the alerts.

Listener

In one embodiment, the listener 110 in system 200 is responsible for collecting real-time data feeds or substantially real-time data feeds (e.g., feeds 105) from one or more resources in the retail environment being monitored (e.g., point of sale resources 210, monitor resources 220, etc.).

Since every retailer has a different set of data from which information can be retrieved, this may be a nontrivial task, often requiring special connectors for each POS type (Retalix, IBM, NCR, etc.) and data structures. Furthermore, video typically can be received in a variety of formats, including analog/CCTV cameras, IP cameras with different transfer protocols, different codecs, resolution, etc.

Analysis Engine

In accordance with further embodiments, as mentioned, the analysis engine 120 can be configured to monitor for the occurrence of various types of activities of interest (AOIs). The following is a non-limiting list of examples of the types of AOIs the analysis engine 120 can look out for:

1. Sweethearting Detection

As previously discussed, the analysis engine 120 can be configured to accept any suitable type of data such as real-time POS data and video feeds via one or more feeds 105.

In one embodiment, the analysis engine 120 analyzes the video feeds to monitor the activity of cashier, customer, etc., and to track the items and a respective cart before, during, or after a transaction. Events captured by the video feed such as images of a transaction can be cross-referenced or analyzed in view of respective transaction data (e.g., transaction data from a POS data feed such as item scan information) in order to determine when an item present in the video stream or image as detected by the analysis engine 120 does not appear to have been properly recorded by a corresponding point of sale transaction log (e.g., item scan log). In other words, the feeds 105 can include images of a transaction as well as corresponding point of sale data generated for the transaction.

A comparison of the images and the corresponding point of sale transaction data typically indicates whether all items taken into possession by the customer were properly scanned at the checkout terminal. If there is one or more item that was not properly scanned as being purchased during a transaction, as determined by a discrepancy between the transaction images and the transaction log, the analysis engine 120 generates an alert of the event to alerter 130.

Additional specific ways of detecting a trigger event (e.g., that an item was not properly scanned during checkout, etc.) are described in issued U.S. Pat. No. 7,631,808, the entire teachings of which is incorporated herein by this reference.

2. Cart Pushouts

In accordance with further embodiments, note that the analysis engine 120 can be configured to monitor real-time or substantially real-time video feeds and detect and track locations of shopping carts in the retail environment to generate alerts of possible fraudulent activity.

For instance, the analysis engine 120 can be configured to detect and/or track a presence of shopping carts in one or more predetermined locations in the retail environment such as entry ways (e.g., ingresses such as areas designated for entering the retail environment), exit ways (e.g., egresses such as areas designated for exiting the retail environment), pathways to lavatories accessible to the customer, etc., of a retail store. The retail environment can extend to any type of area such as a building, a lot, etc.

The predetermined areas or locations monitored by the analysis engine 120 can include places where carts typically should not go. One such area is a checkout lane that is currently closed. Customers pushing shopping carts through a closed shopping lane may be stealing items from the respective retail environment. The analysis engine 120 can be configured to monitor a predetermined area such as a closed checkout lane to detect a presence of carts in such an area. Mere presence in such an area can indicate a possible theft.

In accordance with another embodiment, the predetermined area being monitored may be a bypass zone or bypass path in the retail environment circumventing one or more checkout lanes. In other words, areas other than checkout lanes can be monitored for suspicious activity. The bypass path can be located beside a bank of checkout terminals and/or lanes and lead to the exit or entrance of the retail environment. Typically, under normal circumstances, no shopping carts should exit the retail environment via a bypass path. If such an event occurs, personnel can be notified to verify that the shopping cart in the bypass path does not include retail items that have not been scanned for purchase at a checkout lane.

Thus, upon detection of a cart in any of these types of monitored areas, the analysis engine 120 can initiate generation of one or more alerts to the alerter 130. In this example embodiment, the alerter 130 provides notification of the presence of the shopping carts in the predetermined areas to one or more registered target recipients.

In one embodiment, the alerter 130 transmits a respective notification message to store personnel, security personnel, attendant, etc., notifying them of a possible cart pushout event in which a customer leaves a store without paying for respective merchandise. The party (e.g., retail personnel) receiving the notification can inspect the suspicious activity, cart, customer, etc., to prevent shrinkage.

Note that cart pushouts can also occur via passing through a checkout lane that has no marking one way or another indicating whether it is closed or inactive. In such an instance, examination against the register's associated transaction data is performed, in order to determine that no transaction was occurring during the time the cart was pushed through the checkout lane, point of sale terminal, cash register, etc. Thus, if the cart passes though an open checkout lane, and there is no recorded transaction, the analysis engine 120 flags the condition as being suspicious and generates an alert to alerter 130. The alerter 130 sends out a respective notification to one or more registered parties.

Additionally, there may be a situation in which a transaction is currently occurring (i.e., in progress), but that the customer did not complete the transaction by paying for scanned items. The analysis engine 120 can detect this event based on an analysis of the transaction data received on feed 105-1 by noting the omission of any tender information. In other words, a transaction log produced for the transaction may indicate that no payment was received from the customer taking possession of respective items.

Note that any suitable method can be used to track the carts presence of the carts in predetermined areas. For example, as mentioned, images can be analyzed to identify presence of carts.

Additional details of tracking shopping carts can be found in related U.S. patent application Ser. No. 12/047,042, entitled "Cart Inspection For Suspicious Items," the entire teachings of which are incorporated here by this reference.

One simple method of monitoring a presence of shopping carts in a respective predetermined area is to perform a frame difference on images in order to look for areas of motions. In a closed checkout lane, there would not be any expectation of movement of a shopping cart, so frame differencing or optical flow could be a fast and economical way of detecting carts.

Generating false positives (e.g., indicating that a cart pushout has occurred when it actually has not) of cart pushouts may be undesirable. In such a circumstance, however, it maybe useful to additionally perform a filtering step. As an example, in this case, the motion detected by frame differencing or optical flow can itself be analyzed to determine the breadth and strength of the resulting motion parameters. Since shopping carts are typically large and edgy objects, a moving cart will produce many large motion features. Filtering on size and/or number of motion features can help eliminate false positives that a shopping cart is present in a predetermined location being monitored.

Another method to monitor a presence of shopping carts is to use classic far-field tracking techniques. In such an instance, background models can be maintained in the predetermined areas being monitored. Frames of video are then compared to the background model in order to find the foreground or moving objects in such an area. Similar to frame differencing as discussed above, the size and shape of such a foreground "silhouette" will be indicative of a cart passing through the monitored area.

Yet another method embodiment can implement a feature-based approach. In this example case, features can be extracted from each frame of video and tracked through subsequent frames in the video. These features can then be analyzed in order to determine whether they correspond to features of a cart. Such an analysis step can itself be decomposed into one of several different techniques. For instance, the features can be compared to hard-coded values. This approach works best when the tracked features are easily understood and are themselves distinct. Such features can be thresholded or compared to absolute values chosen by experts.

Another approach is to compare the detected features of an object in a monitored area to a model developed during a training phase on labeled training data. Such models can be updated over time by incorporating more examples of carts and the features extracted from them into the models. The optional validation step described herein in detail below may be used as feedback of labeled cart data.

Accordingly, any suitable method can be used to detect a presence of a shopping cart in a monitored area.

3. Customer Alert

In certain instances, retailers may wish to be alerted to the presence of certain customers of interest in their stores (e.g., a retail environment). For example, retailers operating a sweethearting detection system to catch fraudulent scanning activity may detect repeat customers committing fraudulent activity such as stealing of retail items as a result of improper scanning of the item at self-checkouts or manned checkouts in the store. Upon determining that further action may be required, such retailers may set up an alert to indicate when the customer has come back in to shop in the retail environment, either to catch the customers in a further act of fraud (e.g., larceny) or to simply pursue further dialog or activity with said customer.

To this end, in accordance with one embodiment, the analysis engine 120 can be configured to look for the presence of identifying material in either one of or both of the POS data streams (e.g., feed 105-1) and the video streams (e.g., feed 105-2). The information in any of the one or more feeds 105 may indicate presence of a particular person, group of persons, etc., that are present on a watch list.

Presence of a particular customer in the retail environment can be achieved in any suitable way. For example, in one embodiment, the analysis engine 120 can identify information and/or events that occur within the POS streams from feed 105-1 based on and mapping identifying information (e.g., loyalty card information, credit card information, etc.) in the feed 105-1 to a corresponding identity of a customer.

In one embodiment, the analysis engine 120 checks whether the identified customer or unique information associated with the customer is included in a watch list 250.

In accordance with one specific embodiment, the analysis engine 120 looks for PCI compliant (masked or hashed) credit card information and compares such information against the watch list 250 to determine whether a particular customer is present in the retail environment. ("PCI compliant" refers to compliance with security specifications of the Personal Card Industry consortium.)

In accordance with further embodiments, the analysis engine 120 can be configured to monitor different items currently being purchased by a customer and perform a so-called basket analysis. In such an instance, the analysis engine 120 can be configured to determine an identity of the customer based on identifying items being purchased and matching the items to a pattern associated with a particular customer that repeatedly buys such items. Thus, such information as basket analysis may be employed in certain circumstances, if the customer's purchasing pattern is distinct.

Furthermore, as will be discussed further later in this specification, the video stream from one or more resources 220 may be analyzed to determine an identity of a customer. Determining an identity of a customer can include implementing face recognition, body or pose recognition, etc., with respect to the images received in the feed 105-2.

Figure 13:
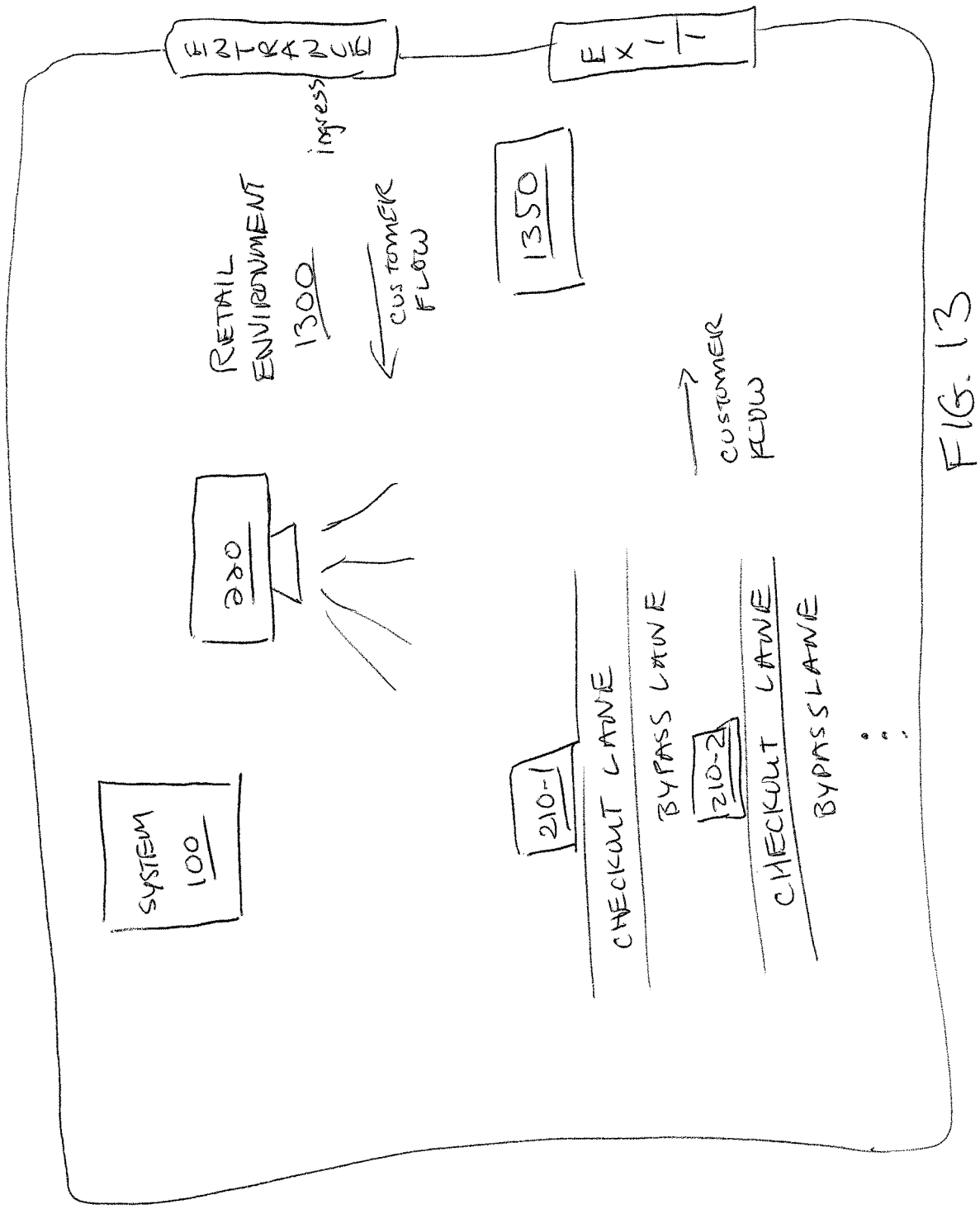
FIG. 13 is an example diagram illustrating a layout of a retail environment according to embodiments herein.

FIG. 13 is a diagram illustrating an example layout of a retail environment according to embodiments herein.

As shown, in one example embodiment, the retail environment 1300 such as a building includes multiple point of sale terminals 210-1, 210-2, etc., to scan and purchase items. One or more shopping carts typically occupy checkout lanes. Monitor resources 220 monitor one or more predetermined locations in the retail environment 1300 such as bypass lanes, checkout lanes, ingress, egress, etc., for cart pushout events. In one embodiment, as mentioned, the system 100 can generate one or more notifications 135 as a command to activate alarm system 1350 (e.g., an instance of device 150), control point of sale terminals 210, activate respective alarms in a vicinity of the checkout lanes, etc. As mentioned, device 150 (represented by alarm system 1350 in this instance) can be located at a point of sale terminal, near an egress pathway of the retail environment 1300, etc.

Figure 3:
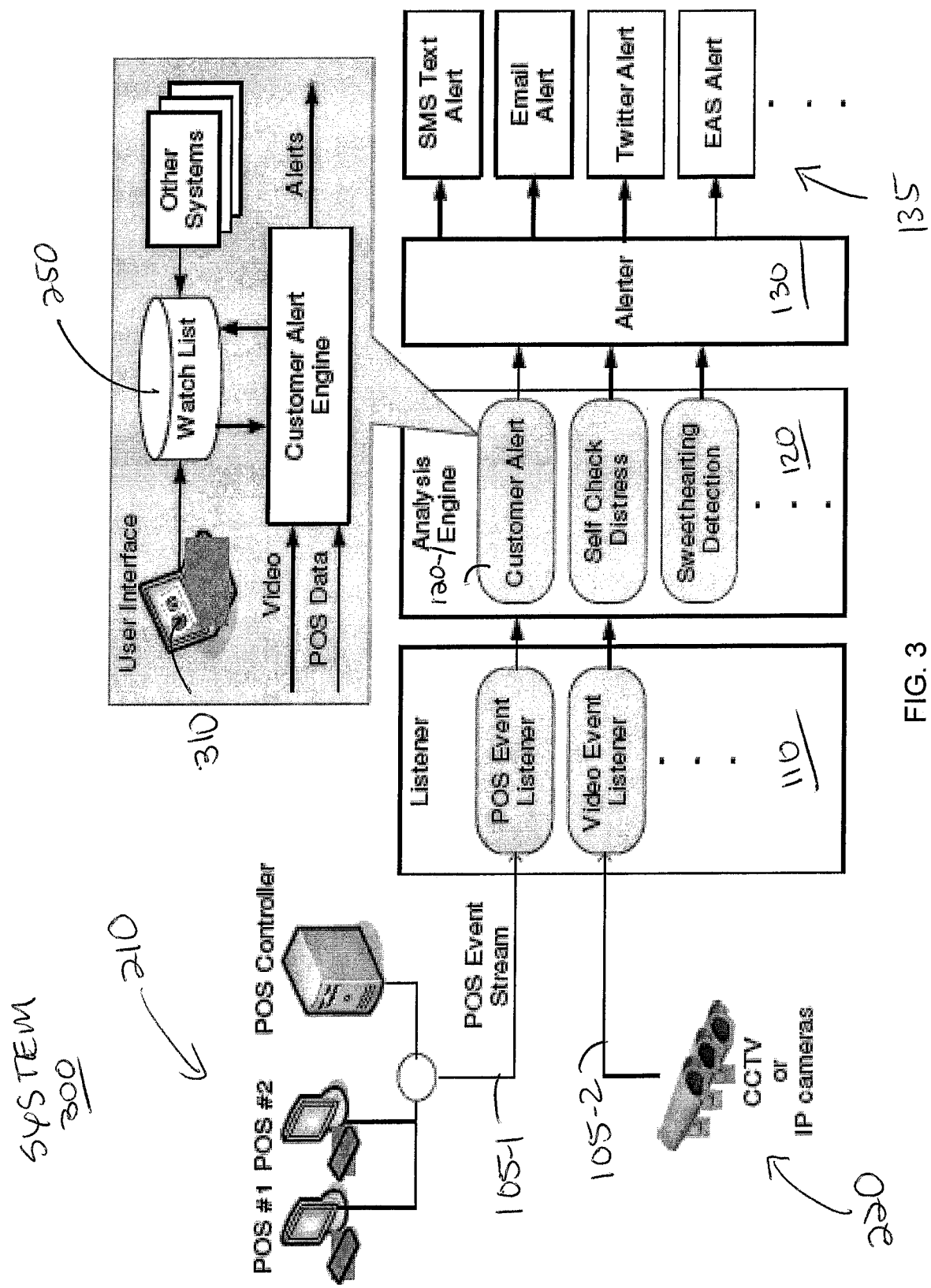
FIG. 3 is a more detailed example diagram of a retail system for providing alerts based on a watch list according to embodiments herein.

FIG. 3 is an example diagram illustrating system 300 (e.g., a more detailed version of system 100) according to embodiments herein.

As shown, watch list 250 (e.g., a list of customers, unique data associated with customers of interest, etc.) can be populated in one of several ways.

As a non-limiting example, a customer watch list 250 can be populated via input received from user interface 310. The user interface 310 enables respective personnel to edit watch list 250.

In yet further embodiments, a watch list 250 can be automatically populated based on automated loss prevention or other systems. For instance, if a retailer employs an automated loss detection analysis system in the retail environment, upon detection of one or more suspicious transactions or fraudulent incidences involving a particular customer, that customer may be added to the watch list 250. Furthermore, the watch list 250 can be populated by the customer appearing in an exception as reported by a legacy data mining system such as an exception reporting system.

By way of a non-limiting example, the customer alert module 120-1 receives POS feeds and video input feeds from listener 110 and produces an alert in response to detecting presence of a watch listed customer (e.g., customer named in the watch list 250) in the retail environment. As mentioned, the watch list 250 itself can be filled in any of multiple suitable ways. For example, as mentioned, the watch list 250 can be modified based on input from a user interface 310, from third-party systems, or from feedback from the analysis engine 120, etc. Based on the alert from analysis engine 120, the alerter sends out notifications to one or more appropriate parties.

Customer-Cashier Pair Alert

As a related example, the watch list 250 can be configured to include a customer-cashier pairing. In such an instance, the pairing includes a unique identity of a customer and a unique identity of a cashier. Such an embodiment may be useful in looking for collusion or sweethearting between a particular cashier and customer in the pairing. For example, the customer may be the cashier's friend and make it appear as though the items are being properly scanned during a transaction even though they are not.

The customer-cashier pair could be added to the watch list 250 either manually by the retailer via a user interface or automatically by a system such as loss detection analysis system or exception reporting system. For instance, if a retailer employs an automated loss detection analysis system, such as those offered by StopLift, Inc, upon detection of one or more transactions involving a particular customer-cashier pair, that customer-cashier pair may be added to the watch list.

As an example, an identity pair in watch list 250 can include customer X and cashier Y. The analysis engine 120 monitors the retail environment in a manner as previously discussed. Detection of the presence of customer X at a checkout lane operated by the cashier Y results in generation of an alert to appropriate store personnel.

Random Audit Alert

In one embodiment, the analysis engine 120 is configured to trigger alerts randomly, such as to audit a small fraction of the transactions coming through a point of sale system.

In another related embodiment, the analysis engine 120 is configured to trigger alerts quasi-randomly. Where available, the analysis engine 120 can be configured to take into account identifying information (as described above with respect to the customer alert); and where such information is not available, the analysis engine 120 will initiate triggering of alerts either completely randomly or randomly with probability weighted toward particular characteristics of the transaction data. For example, the transactions with greater occurrences of voided items or items for which bagging was intentionally skipped (e.g., using the "skip bag" button at a self-checkout) may have greater probability weighting of being flagged for an audit.

The motivation of such an embodiment is to keep customers and self-checkout attendants aware that loss prevention measures are in place regardless of the presence of identifying information.

Self-Checkout Distress

In accordance with further embodiments, the analysis engine 120 can be configured to look for signs of customer trouble at self-checkout lanes of the retail environment in which the customer scans items for purchase. For example, the system 300 can be configured to identify occurrence of large-sized time gaps between successive scans, in order to determine when a customer operating a self-checkout register is having trouble scanning of items at the point of sale terminal.

The system 300 can also analyze the received video feeds 105-2 (e.g., image information of a transaction) in order to employ pose estimation and other visual techniques to determine if a customer is becoming frustrated. Upon determining that a customer is in need of help, the analysis engine 120 can be configured to generate an appropriate alert to the alerter 130. In such an instance, the alerter 130 can be configured to provide a notification to a self-checkout attendant to help the customer in distress.

Any suitable method can be used to determine whether a customer is becoming frustrated. For instance, embodiments herein can include detecting an event or events such as multiple attempts by the customer to scan the same item. Such information may be available from a transaction log produced by the point of sale terminal operated by the customer. This may be an indicator of frustration. Via one or more video feeds, distress can be detected by simple tracking of motion features in a designated area (in this case, the scanner area). Multiple passes through the same area without corresponding motion in either the input or output areas is an indicator of multiple scan attempts of the same item.

Additionally, or alternatively, a purely data based approach also can be employed in which the time between scans is used as a measure to detect frustration.

In accordance with further embodiments, a pose estimation approach to determining if the customer is becoming frustrated could be to analyze the customer's pose. A wide stance could be an indicator of frustration. Pacing and other repetitive motions without corresponding activity in the input or output areas could be a further indication of frustration. Observation of customer's head motions as an intent to engage the self-check attendant can also be used as an indicator that help is needed.

Customers can be added to a self-checkout distress watch list manually by a user and/or after the fact as well. The watch list would operate in a similar manner as discussed above such that personnel in the retail environment are notified of customers that typically need help. For example, if a self-checkout attendant notices a customer having trouble at the self-checkout, the attendant may put that customer on the watch list 250 such that an attendant can be alerted next time the customer is at the checkout so as to proactively provide assistance to the customer.

Moreover, if a user of a video recording system or video analysis system and/or data analysis system sees video of a customer having trouble operating a self-checkout, the user can add the customer to the watch list 250 as well.

A data analysis system can be implemented to identify occurrence of long times between consecutive scans as a measure of distress. A video analysis system can be used to analyze the video feeds in order to employ pose estimation and other visual techniques to determine if a customer is becoming frustrated.

Upon detecting a high degree of frustration or distress on one or more occasions, an analysis system could automatically place the customer on the self-checkout distress list. Alternatively an analysis system could present one or more video segments of suspected frustration to a reviewer (e.g., human viewer, machine, etc.) for validation; and upon positive validation of frustration, the customer can be added to the self-checkout distress watch list.

Figure 4:
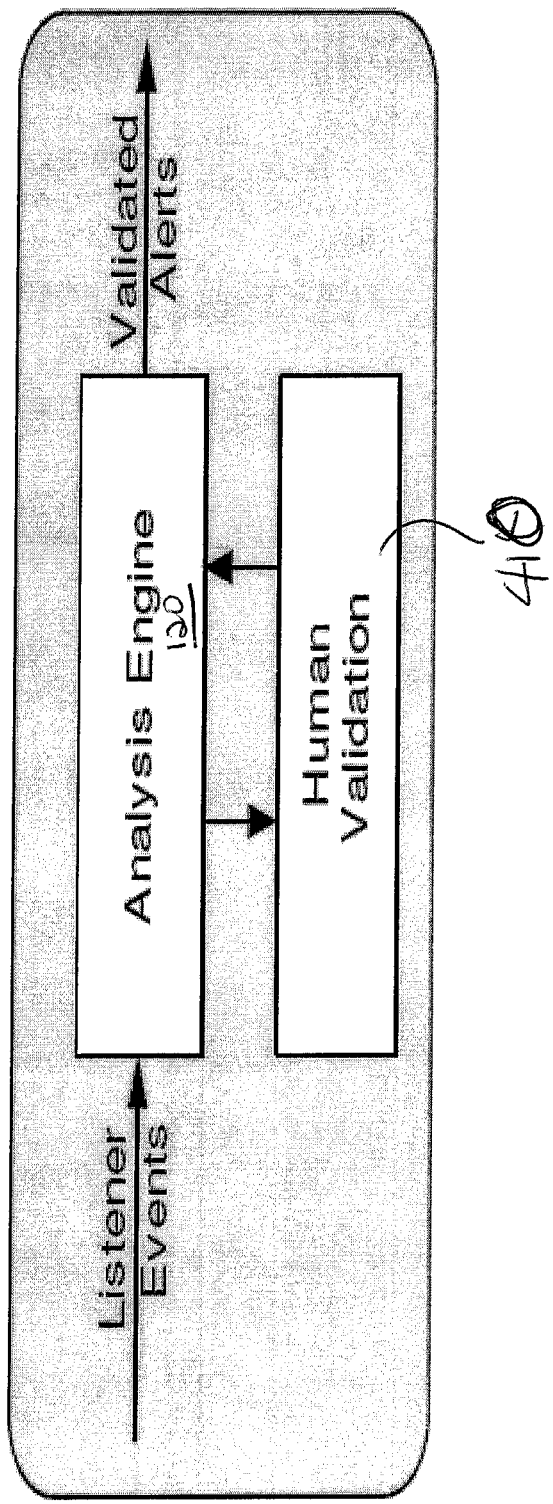
FIG. 4 is an example diagram of implementing human validation according to embodiments herein.

FIG. 4 is an example diagram illustrating validation according to embodiments herein.

As shown, the analysis engine 120 can be enhanced to include an optional incorporation of human validation into the process. In other words, video and/or transaction log information can be reviewed by a human reviewer to detect events of interest requiring notification. The reviewer can flag occurrence of certain events.

In one embodiment, human validation (e.g., review of an alert by a human operator) is used to verify, or validate, potential alerts the analysis engine 120 generates. Via human validation, the potential alert (e.g., an preliminary alert generated by the analysis engine 120) undergoes validation before the alert is sent out to the alerter for action. Thus, embodiments herein can include generating a preliminary alert in a first stage and then validating the preliminary alert via a second stage prior to issuance of an alert to retail personnel. This semi-automated approach can be beneficial to the performance of the analysis engine 120.

As previously described, the analysis engine 120 receives one or more feeds 105 (e.g., image feeds, point of sale feeds, etc.) and analyzes those feeds 105 to detect occurrence of patterns or conditions that result in generation of a respective alert. In one embodiment, the analysis engine 120 can produce suspected alerts or preliminary alerts that would benefit from further analysis before being confirmed as a real alert resulting in transmission of the notification to a target resource. In this case, a semi-automated approach is taken, which allows human analysts to contribute in real-time to the analysis task.

FIG. 4 shows how this optional human validation 410 of potential alerts fits into the analysis framework according to embodiments herein. In other words, any of the processes or methods executed by the analysis engine 120 can include use of a remote processor (e.g., a human reviews) to verify whether a preliminary alert detected by the analysis engine 120 is valid or not.

In accordance with previous embodiments, inputs into the analysis engine 120 include real time or substantially real time generated data feeds produced in the retail environment. When using validation feedback, validation results produced by the human validation 410 are also added to the inputs of the analysis engine 120.

By way of a non-limiting example, the processing data flow can be as follows: The analysis engine 120 automatically analyzes real time data feeds in a manner as previously discussed. The analysis engine 120 generates preliminary or potential alerts based on detecting events. The analysis engine 120 may be uncertain as to whether a detected event is suspicious or not. Thus, the analysis engine 120 generates a preliminary alert.

The analysis engine 120 forwards the preliminary alert and corresponding data (e.g., transaction data, image data, etc. associated with the transaction) to a remotely located validation site (e.g., remote processor) in order to verify the validity of the preliminary alert(s). The validation site (e.g., remote processor) may be located on or off premises. In other words, the validation system (e.g., providing human validation 410) can be remotely located with respect to the retail environment being monitored. In one embodiment, the human validation 410 can include one or more reviewers that review the alert in view of information such as the transaction log, video, etc., to make a determination whether the preliminary alert is valid or not. If the preliminary alert is valid, the human validation 410 provides feedback to the analysis engine 120 that the alerter 130 should produce a notification to retail personnel.

The "associated data" transmitted to remote processor in this case can include any and all data necessary to confirm or deny the preliminary alert. Upon verifying that the preliminary alter received from the analysis engine 120 is valid, the human validation 410 provides feedback to the analysis engine 120 (e.g., over a network connection) that the preliminary alert is valid. The analysis engine then communicates the valid alert to the alerter 130 to produce notifications in a manner as previously discussed.

Figure 5:
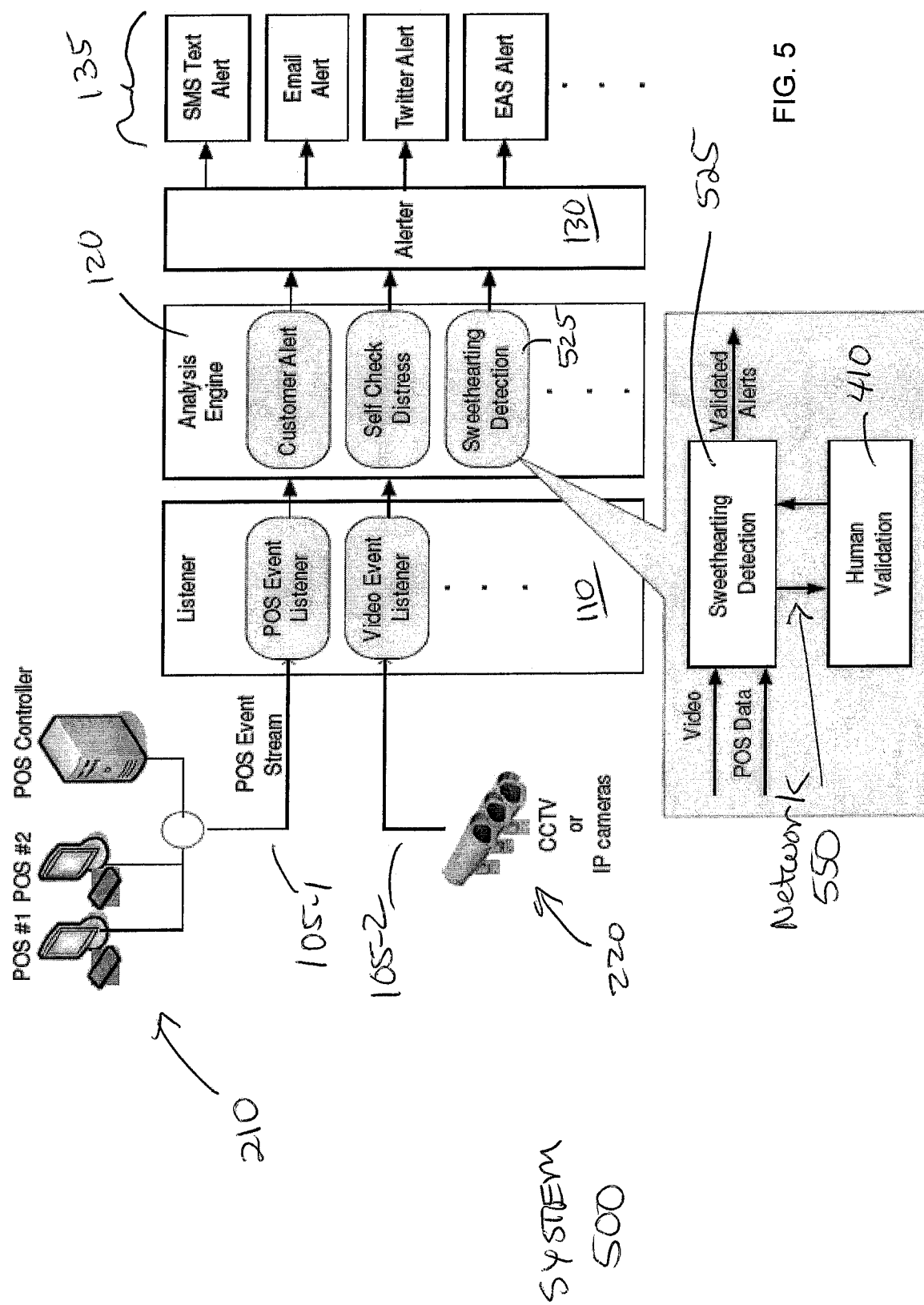
FIG. 5 is an example diagram of a retail system for providing alerts in response to sweethearting events according to embodiments herein.
Figure 6:
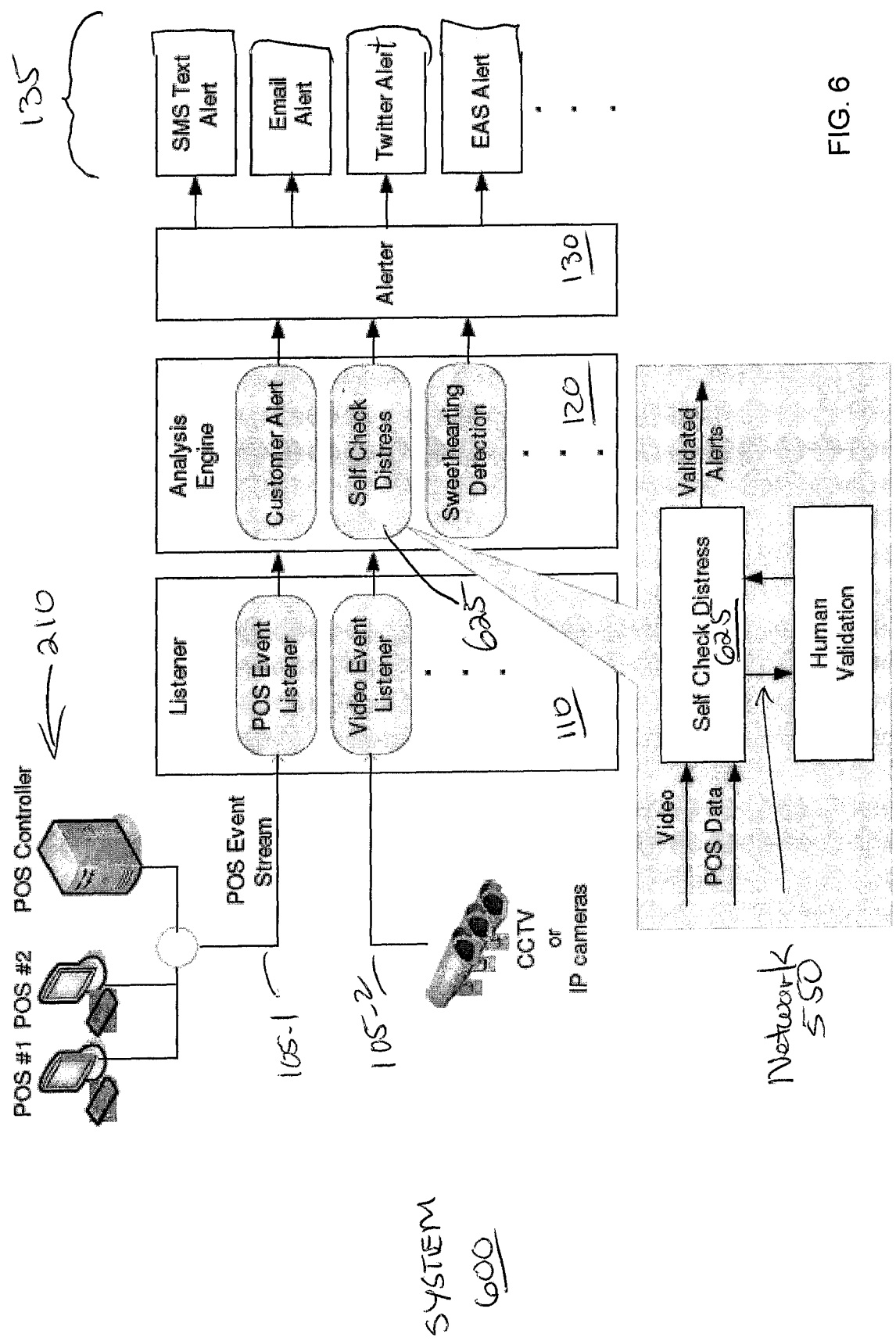
FIG. 6 is an example diagram of a retail system for providing alerts based on self-check distress according to embodiments herein.

Subsequent FIGS. 5 and 6 show more complete embodiments describing how human validation fits into the sweethearting and self-checkout distress detection modules according to embodiments herein.

For example, FIG. 5 is an example diagram of system 500 (e.g., a more detailed version of system 100) illustrating optional human validation according to embodiments herein.

In this example, the sweethearting detection module 525 executed by analysis engine 120 analyzes real-time video and POS data (e.g., transaction data) received on one or more feeds 105 monitoring a respective transaction. Upon detecting a discrepancy in items between POS data and visual detections of items being scanned, suspect alerts are generated. In other words, upon detecting that items pass by a scanner of a point of sale device, but are not properly scanned for purchase by the point of sale device, the sweethearting detection module 525 generates one or more preliminary alerts associated with the transaction.

Upon detecting the suspicious activity, the analysis engine 120 electronically sends the preliminary alerts and associated POS data, video data, etc., to a remote processor site for human validation 410.

Upon review of the preliminary alerts by human validation 410, validation results produced by the human validation 410 (e.g., a remote processor) are fed back into the analysis engine 120. One way to convey the information between the analysis engine 120 and the remote processor (e.g., remotely located human reviewers with respect to the retail environment) is a network 550 such as the Internet. Upon confirmation or validation of the preliminary alerts generated by the analysis engine 120, the analysis engine 120 notifies the alerter 130 to produce one or more notifications.

FIG. 6 is an example diagram illustrating optional human validation in system 600 (e.g., a more detailed version of system 100) according to embodiments herein.

In this example embodiment, the analysis engine 120 executes the self check distress module 625. The self-check distress module executed by the analysis engine 120 analyzes, for each transaction at one or more checkout lanes in the retail environment, video and POS data received on feeds 105. Upon detecting when a customer in a respective checkout lane is frustrated, the analysis engine 120 generates a preliminary alert. The self check distress module 625 transmits the preliminary alert to human validation 410 at a remote location. The remote location includes appropriate display screens and processing devices such that the human reviewers are able to view the information on the feeds 105 in substantially real-time. The human reviewers verify whether the preliminary alert is legitimate. Upon review of said alerts, the human reviewers (e.g., human validation 410) send validation results back to self check distress module 625 executing on the analysis engine 120. Upon confirmation of suspect or preliminary alerts, these self check distress module 625 sends any validated alerts to alerter 130 that, in turn, generates and transmits appropriate notifications in the retail environment.

Alerter Component

Upon receiving a real-time alert of an AOI in progress, the alerter 130 initiates execution one or more actions. The following is a non-limiting list of examples of the types of actions that may be taken.

Sending a Text Message or Email

One such action that the alerter 130 can take is to send a text message or email or other such notification to one or more registered recipients. The contents of the text message or email can include information helpful to an investigator or other personnel of the retail environment. For instance, the notification sent by the alerter 130 to the recipients can specify a customer of interest, a checkout lane in which a customer needs helpful, type of detected event, etc.

The notification (e.g., e-mail, text message, etc.) produced by the alerter 130 can include a picture or video segment of a respective customer. The picture or video can be copied either from the real-time video feed or from a database of imagery and video associated with the customer.

The notification (e.g., e-mail, text message, etc.) produced by the alerter 130 may also contain summary information relating to this customer, including information ascertained by his or her customer loyalty card, a summary of their recent transactions, or even a history of incidents in which this customer has been involved, etc.

Figure 7:
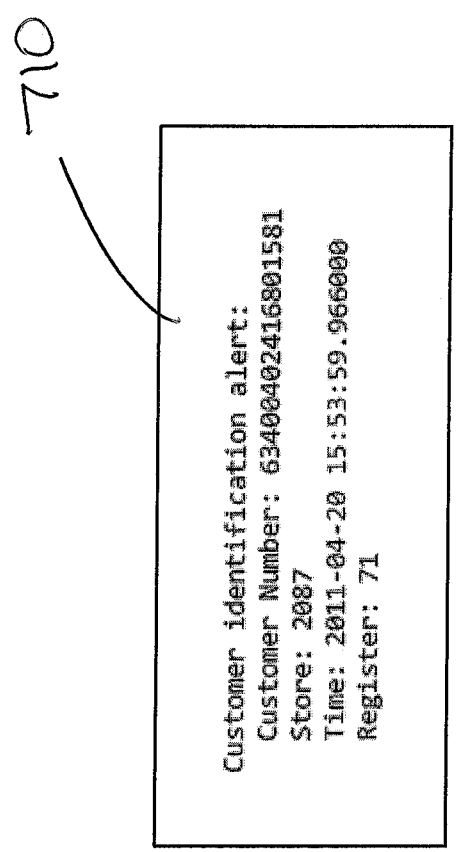
FIG. 7 is an example diagram illustrating of customer information according to embodiments herein.

FIG. 7 is an example diagram illustrating of customer information that can be included in a respective notification according to embodiments herein.

Customer identification alert:
  Customer Number: 63400402416801581
  Store: 2087
  Time: 2011-04-20 15:53:59.966000
  Register: 71

As shown, the customer information produced by the alerter 130 can include a unique identity value (e.g., 63400402416801581) assigned to the customer, the store number (e.g., 2087) where the event takes place, the time (e.g., 2011-04-20 15:53:59.966000) of the transaction or time of issuance of the notification, the checkout register (e.g., 71), etc.

As previously discussed, one or more persons and/or corresponding communication devices (e.g., instance of devices 150) operated by the one or more persons can be registered to receive the different types of notifications. Registration information indicating where to send the notifications and under what circumstances can be received from a number of different resources. For instance, the registration of such recipients can be done from a central location using a user interface or other means. Registering recipients can also occur automatically, for example by looking for cashier/attendant check-ins and check-outs. In this manner, the cashier/attendant on-duty can be automatically added as a recipient of any such messages. Furthermore, cashier/attendant check-outs can be observed to de-register a cashier/attendant from receiving such messages.

Tweeting the Alert

Social networks are becoming a popular way of rapidly communicating information to many people. As such, upon receipt of an alert (to generate and send a notification), the alerter 130 can be configured to communicate the details of the alert (see specific example specified above in the previous section), via a web API or other mechanism, to social networking sites such as Twitter™ or Facebook™.

Cashier/Attendant Alert

The alerter 130 can be configured to communicate alerts directly to a POS system in order to direct the cashier or attendant of the nature of the alert. Thus, an employee such as a checkout lane attendant in the retail environment can receive notification of the events via respective point of sale equipment in the checkout lane where the employee is stationed to work. Thus, the notification is integrated into the point of sale system operated by an attendant. Such integration allows the alerter 130 to integrate seamlessly in a retailer's existing infrastructure. If POS integration is not possible or not desirable, a small alerting device (such as a communication device operated by a respective employee in the retail environment) may be configured to display messages and/or graphics associated with an incident as specified by the notification.

The communication device operated by the employee can enable the employee to provide feedback concerning the flagged incident. For example, the employee may provide information indicating whether backup is needed, the employee can indicate if the flagged incident as specified by the notification was a false alarm, etc.

Halting the Transaction

A motivating example in accordance with embodiments herein is the prevention of improper scans by customers at self checkout lanes in the retail environment, whether accidental or intentional. To this end, the alerter 130 can be configured to communicate with a respective POS system at the time of the alert. Such communication from the alerter 130 to the POS system can direct the POS system to halt the transaction and await further assistance from the self-check attendant or other store personnel.

In another embodiment, a transaction can be halted upon the generation of an alert by the analysis engine 120 (and generated notification by the alerter 130) indicating a possible improper scan has occurred at a specified checkout lane. Halting can occur on any type of checkout lane (e.g., manned checkout lane, self-checkout lane, etc.).

In one embodiment, retail personnel with the proper authorization can look into a detected incident as specified by the notification produced by the alerter 130. The retail personnel can located on or off site with respect to the retail environment. The retail personnel can be an employee of the retailer or otherwise authorized by the retailer to oversee incidents flagged by the alerter 130. For instance, the authorized person could be an employee of an analysis company tasked with the role of transaction oversight (also see previous section on Human Validation).

The checking by the authorized person can take the form of checking the transaction log up to that point and correlating it with either a portion of the video of the transaction up to that point or via direct observation of the items in question if the authorized person is on-site. Upon confirmation that the incident is true (e.g., that the preliminary alert of an incident), onsite personnel in the retail environment can be alerted to provide assistant and/or look into the matter further. Upon denial of the alert, the transaction is allowed to continue without generation of the notification to retail personnel.

In accordance with one embodiment, assuming an off-site authorized person (e.g., a remote processor) is conducting the oversight and validation of possible alerts, the result of such a denial of the alert by the authorized person (i.e., a false positive) is a small delay in the ringing up of the transaction observed by cashier and customer while the alert is validated transparently and in the background.

In another embodiment, during the delay (for example, if due to detection of self-checkout stress), an authorized personnel may "call down" and provide live help to the customer through the use of audio and/or video. The audio and/or video may be incorporated directly into the self-checkout unit or achieved through a separate device or multiple devices. This kind of "call down" may also be done with no halting of the respective transaction.

Automatic Item Scanning

In further embodiments, the analysis engine 120 may also provide details to the alerter of a specific item in question that was not scanned properly. Such details of the suspicious activity can be included in the notification to retail personnel. This may indicate that sweethearting or some other form of fraud is taking place.

In the more common and less malicious case, it may also indicate that inattention on the part of a cashier or customer at a self check is taking place. In such an instance, instead of directing the POS system to halt the transaction as in the previous section, the alerter 130 (via one or more generated notifications) may direct a target POS device to auto-insert the item in question into the customer's order. That is, the alerter 130 may "ring-up" the item automatically for the customer or cashier. Likewise such an insertion could be directed by a human validator alerted by the system.

EAS-Style Pedestal Alert

EAS-style pedestal alarms are commonplace at the entryways and exits of a respective retail establishment. These pedestals typically signal an alarm when an wireless ID tag embedded in an article for purchase was not deactivated. When this happens, the alarm sounds and an employee is usually deployed to check on the customer and their baggage who set off the alarm. Consumers are accustomed to seeing EAS pedestals and know how to react to these alarms. For example, upon sounding of an EAS alarm, the customer knows to discontinue leaving the store as an item in the possession likely set off the alarm.

Embodiments herein can include simulating such an EAS type alarm upon detection of any of the different types of trigger conditions as discussed herein. More specifically, in one embodiment, upon receiving an alert from the analysis engine 120 that indicates to sound the alarm for a given customer leaving the retail environment, the alerter 130 can be configured to sound off the alarm of an EAS style pedestal upon the crossing of a threshold indicated by the customer.

The EAS style pedestal can be a pre-existing pedestal or a mock pedestal. In the case of preexisting EAS pedestals, it is possible for the alerter 130 to set off the preexisting pedestal's alarm. In the case of a mock pedestal, an alarm mechanism similar to those of EAS-Style pedestals is set off.

To produce an alert, embodiments herein can include tracking the customer in question via overhead or other-positioned CCTV or IP cameras set up in the store. Upon crossing a threshold location, "tripwire", etc., the alarm is then sounded. Tracking with respect to a pedestal may also be accomplished or by manual observation of a live video feed. Controlling the alarm of an EAS style pedestal or mock EAS pedestal can be used in conjunction with different embodiments such as sweethearting detection, cart pushout detection, etc.

Figure 8:
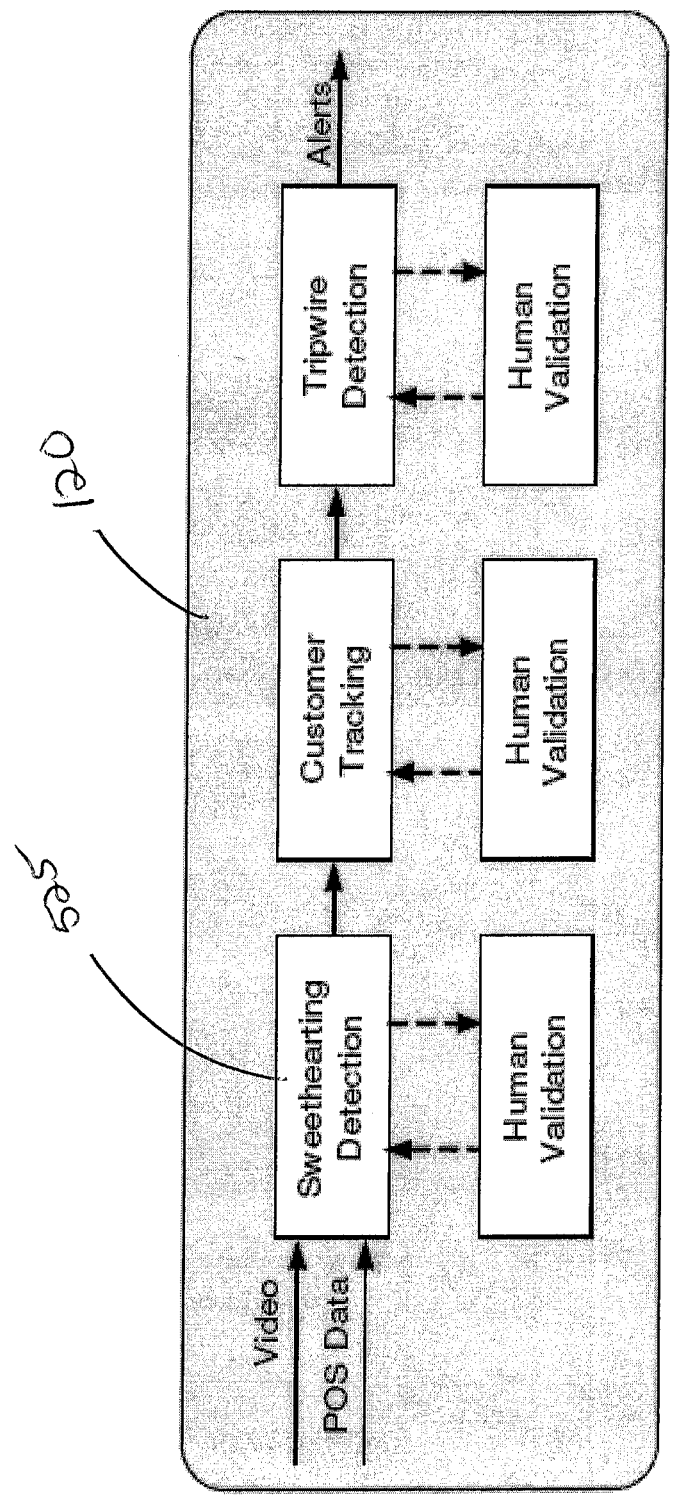
FIG. 8 is an example diagram illustrating of controlling alarms according to embodiments herein.

As an example, consider the case of automated sweethearting detection coupled with an EAS-style alerting mechanism. As shown in FIG. 8, video and POS data is fed into the analysis engine 120. As described previously, the sweethearting detection module 525 generates alerts indicating the presence on non-scanned items. Optionally, such alerts could be coupled with a human validation process (e.g., a remote processor) in order to enhance the efficacy of the process.

Upon the detection (and optional validation) of items that have been sweethearted or otherwise unrecorded by the POS, a location of the customer is then tracked on access path to the EAS-style pedestals, the mock pedestals, or some other area such as the entry or exit way to the store.

The customer can be tracked using standard computer vision tracking techniques and may include the tracking of the customer, his or her cart, or other associated objects. Again, optional validation can be performed to facilitate the detection and tracking process. Upon tracking of the customer to the designated area where the alarm will be sounded or visually displayed, the analysis engine 120 generates and transmits an alert to the alerter 130. The alerter 130 generates and transmits the notification (e.g., a command) to the appropriate alarm device. Via the notification produced by the alerter 130, the alarm is sounded indicating that the customer should halt and wait to be attended to by a store employee.

One advantage of the method of alert/alarm is that customers and retail employees alike are already socialized to the expectation of an inspection of the customers bags upon such an alarm, and thus questioning of the retail employee by the customer as to why they are being stopped and inspected is minimized.

Figure 9:
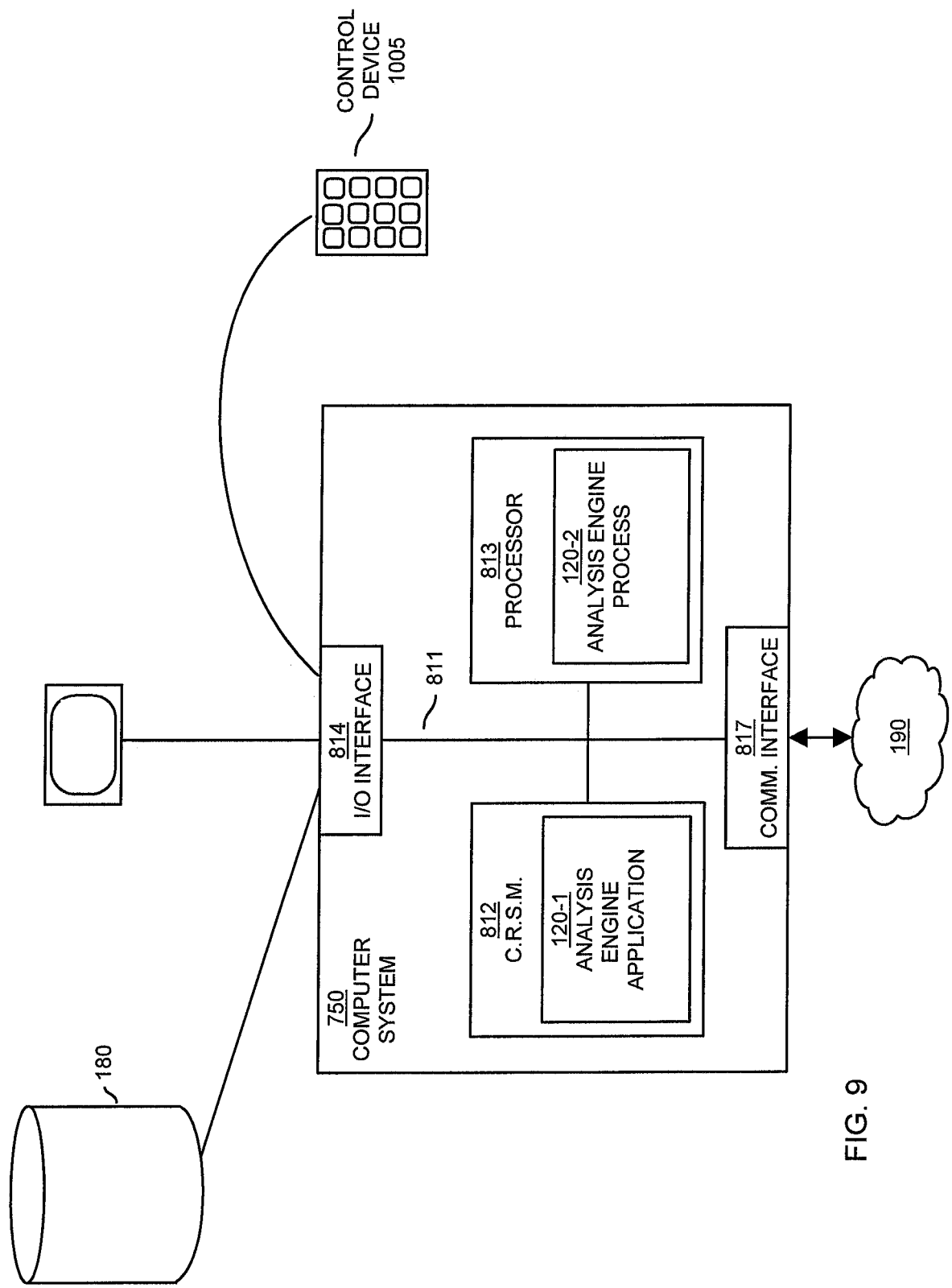
FIG. 9 is a diagram illustrating an example computer architecture for carrying out functionality according to embodiments herein.

FIG. 9 is an example block diagram of a computer system for implementing any of the operations as discussed herein according to embodiments herein.

Computer system 750 can reside in any of the resources as discussed herein such as system 100, system 200, system 300, etc.

As shown, computer system 750 of the present example can include an interconnect 811 that couples computer readable storage media 812 such as a non-transitory type of media (i.e., any type of hardware storage medium) in which digital information can be stored and retrieved, a processor 813 (e.g., one or more processing devices), I/O interface 814, and a communications interface 817.

I/O interface 814 provides connectivity to other resources such as repository 180.

Computer readable storage medium 812 can be any hardware storage device such as memory, optical storage, hard drive, floppy disk, etc. In one embodiment, the computer readable storage medium 812 stores instructions and/or data.

Communications interface 817 enables the computer system 750 and processor 813 to communicate over a resource such as network 190 to retrieve information from and/or transmit information to remote sources (e.g., remote processor) and communicate with other computers and/or persons. I/O interface 814 enables processor 813 to retrieve stored information from repository 180.

As shown, computer readable storage media 812 is encoded with analysis engine 120-1 (or other processing module such as listener 110, alerter 130, etc.) executed by processor 813. Analysis engine application 120-1 can be configured to include instructions to implement any of the operations associated with analysis engine 120 as discussed herein.

During operation of one embodiment, processor 813 accesses computer readable storage media 812 via the use of interconnect 811 in order to launch, run, execute, interpret or otherwise perform the instructions in analysis engine application 120-1 stored on computer readable storage medium 812.

Execution of the analysis engine application 120-1 produces processing functionality such as analysis engine process 120-2 in processor 813. In other words, the analysis engine process 120-2 associated with processor 813 represents one or more aspects of executing analysis engine application 120-1 within or upon the processor 813 in the computer system 750.

Those skilled in the art will understand that the computer system 750 can include other processes and/or software and hardware components, such as an operating system that controls allocation and use of hardware resources to execute the analysis engine application 120-1.

In accordance with different embodiments, note that computer system may be any of various types of devices, including, but not limited to, a set-top box, a television, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in a retail environment or external to a retail environment to implement functionality as discussed herein.

Functionality supported by the different resources will now be discussed via flowcharts in FIGS. 10-12. Note that the steps in the flowcharts below can be executed in any suitable order.

Figure 10:
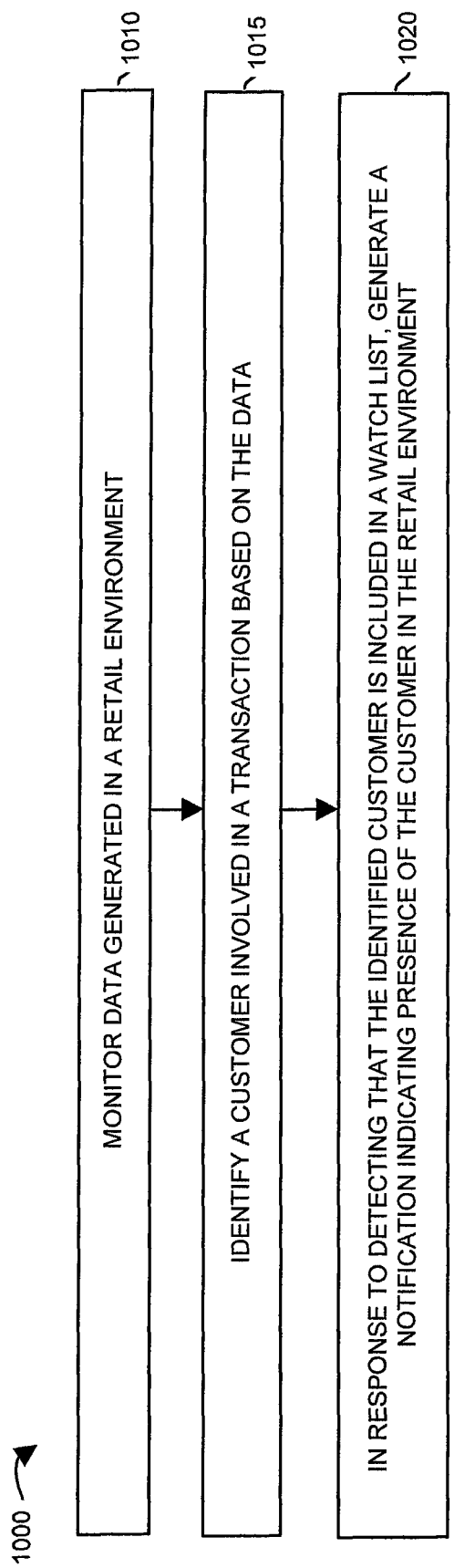
FIGS. 10-12 are example diagrams of methods according to embodiments herein.

FIG. 10 is a flowchart 1000 illustrating an example method according to embodiments herein. Note that there will be some overlap with respect to concepts as discussed above.

In step 1010, the system 100 monitors data generated in a retail environment.

In step 1015, the system 100 identifies a customer involved in a transaction based on the data.

In step 1020, in response to detecting that the identified customer is included in a watch list 250, the system 100 generates a notification indicating presence of the customer in the retail environment.

Figure 11:
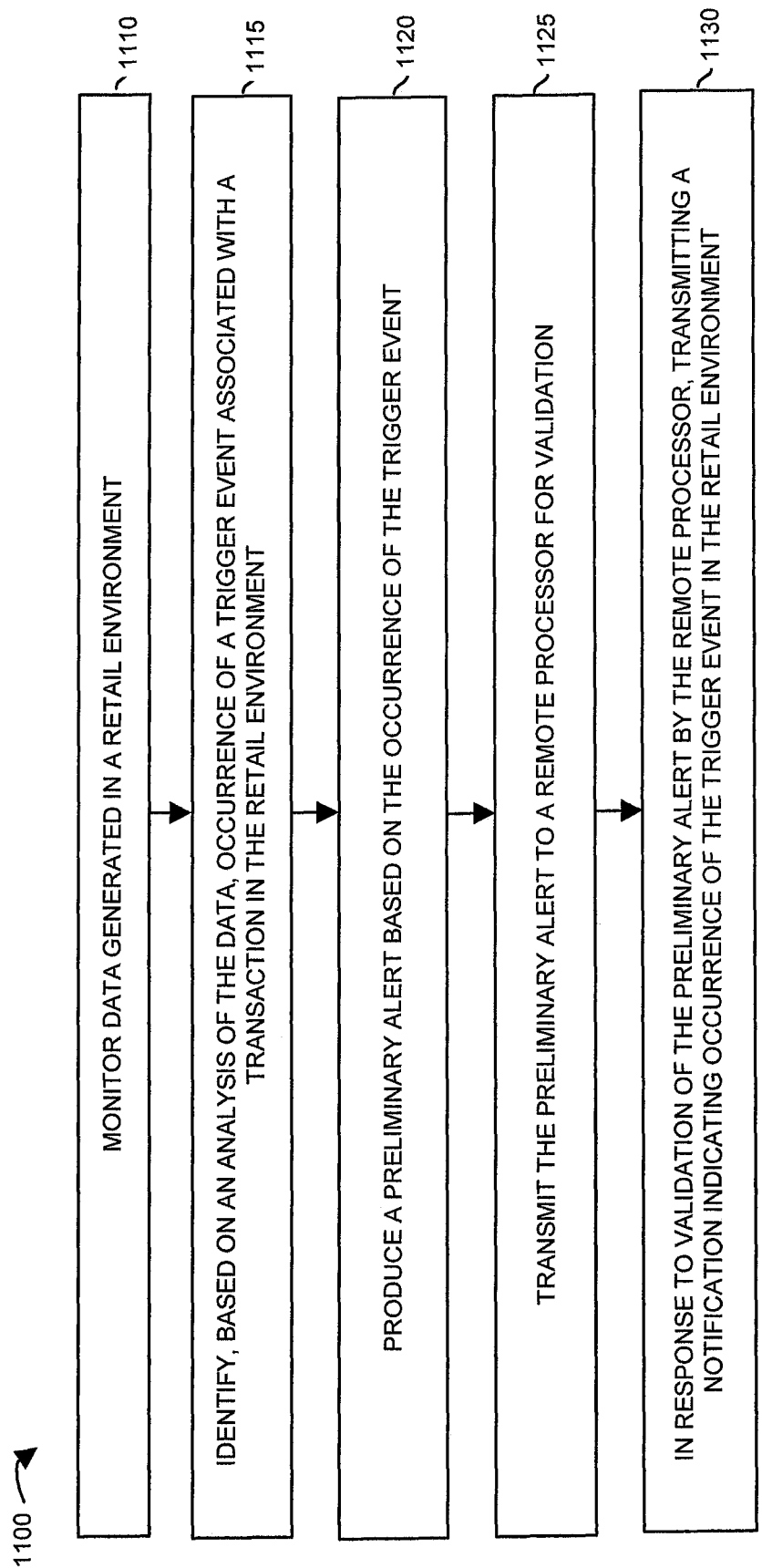

FIG. 11 is a flowchart 1100 illustrating an example method according to embodiments. Note that there will be some overlap with respect to concepts as discussed above.

In step 1110, the system 100 monitors data generated in a retail environment.

In step 1115, the system 100 identifies, based on an analysis of the data, occurrence of a trigger event associated with a transaction in the retail environment In step 1120, the system 100 produces a preliminary alert based on the detected occurrence of the trigger event.

In step 1125, the system 100 transmits the preliminary alert to a remote processor for validation.

In step 1130, in response to validation of the preliminary alert by the remote processor, the system 100 transmits a notification to one or more registered destinations. The notification indicates occurrence of the trigger event in the retail environment.

Figure 12:
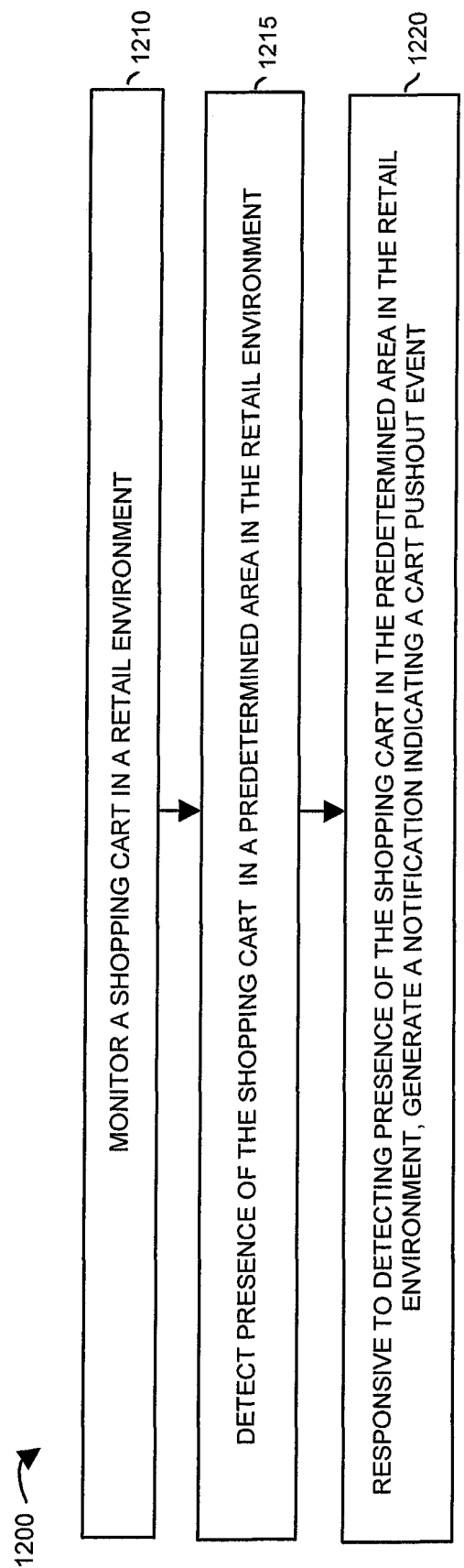

FIG. 12 is a flowchart 1200 illustrating an example method according to embodiments herein. Note that there will be some overlap with respect to concepts as discussed above.

In step 1210, the analysis engine 120 monitors a shopping cart in a retail environment.

In step 1215, the system 100 detects presence of the shopping cart in a predetermined area (i.e., location) in the retail environment.

In step 1220, responsive to detecting presence of the shopping cart in the predetermined area in the retail environment, the system 100 generates a notification indicating a cart pushout event.

Note again that techniques herein are well suited for use in retail environments. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
   in a computer system having at least a processor and a memory, monitoring data generated in a retail environment, the monitored data including at least one or more captured video images of a customer during a POS (Point of Sale) transaction occurring in the retail environment;
   in the computer system, performing a facial recognition analysis of the one or more video images captured during the POS transaction, to identity the customer and determine whether the identified customer is included in a watch list;
   in the computer system, identifying the customer and a store representative as participants involved in the transaction occurring in the retail environment based on the monitored data, the monitored data including at least facial recognition data obtained from the facial recognition analysis of the customer;
   in the computer system, analyzing the watch list to identify whether a combination including the customer and the store representative are included in the watch list, the watch list including identities of multiple persons, the identities of the multiple persons included in the watch list based on detection of corresponding suspicious behavior associated with the multiple persons prior to the transaction;

in the computer system, detecting a cart pushout event by identifying video data indicating a cart operated by the customer is leaving or attempting to leave a particular area identified from predetermined areas of the retail environment that are monitored through the at least one or more of the captured images, identified by the video data, and wherein the cart comprises at least one item which was not properly recorded during the POS transaction, and wherein the particular area is identified from the predetermined areas comprising: a bypass path used to exit the retail environment by bypassing the checkout lanes, an ingress pathway used to enter the retail establishment with the customer leaving the retail environment through the ingress pathway, inactive checkout lanes having no transaction logs for any on-going transactions, and a POS checkout lane having a POS transaction log for the POS transaction;

responsive to detecting that a combination including the customer and the store representative is specified in the watch list of the retail environment, in the computer system, and responsive to detecting the cart pushout event, generating a notification to alert retail personnel;

in the computer system, electronically transmitting the notification, the notification indicating presence of the customer in the retail environment;

prior to the customer exiting the retail environment, in the computer system, transmitting the notification to retail personnel, the notification indicating to the retail personnel that the customer is included on the watch list;

prior to the transaction, in the computer system, producing the watch list to include an identity of the customer based on detecting occurrence of suspicious activity associated with the customer while the customer is in the retail environment; and wherein the notification is generated in a first stage as a preliminary alert, and in the computer system, processing a second stage prior to transmitting the notification that validates the preliminary alert associated with the notification, wherein during the second stage, real-time data feeds produced in the retail environment are provided as first inputs to the second stage and validation results are provided by human validation as second inputs to the second stage, wherein the second inputs represent a validation feedback.

2. The method as in claim 1, wherein, in the computer system, monitoring the data generated in the retail environment includes monitoring point of sale data produced by a checkout terminal in the retail environment, the customer inputting personal information to the checkout terminal; and wherein identifying the customer includes processing the personal information to determine an identity of the customer.

3. The method as in claim 1, wherein the data includes point of sale data generated during the transaction.

4. The method as in claim 1 further comprising:

in the computer system, transmitting the notification to an alarm system in the retail environment, the notification causing the alarm system to produce an alert to at least the customer in the retail environment.

5. The method as in claim 4, wherein the alarm system is a pedestal designed to simulate the appearance and operation of an EAS (Electronic Article Security) pedestal.

6. The method as in claim 1, wherein the data is point of sale data identifying the customer, the identifying based on at least one resource in the group consisting of:
   a customer loyalty card assigned to the customer,
   a credit card used by the customer, and
   an analysis of items purchased by the customer during the transaction.

7. The method as in claim 1 further comprising:
   in the computer system, transmitting the notification to retail personnel in the retail environment, the retail personnel selected from the group consisting of:
   a particular person,
   a particular department,
   a member of a security personnel in the retail environment, and
   a remote video analyst.

8. The method as in claim 1, wherein the notification is of a type selected from the group consisting of:
   an SMS text message,
   an e-mail message,
   a command activating an alarm system located at an exit of a store alerting exiting customers of a potential security breach associated with the transaction,
   a notification indicating to an employee in the retail environment to pay attention to the customer in a self-checkout lane,
   a customer service notification indicating to an employee in the retail environment to provide assistance to the customer in a self-checkout lane,
   a command to halt the transaction,
   an alert message directed to a point of sale system, and
   an alert message directed to a self-checkout.

9. The method as in claim 1 further comprising:
   in the computer system, producing the notification to include a resource type selected from the group consisting of: text, a link to remotely available data, and video data.

10. The method as in claim 1, wherein the store representative is a self-checkout assistant cashier overseeing a self-checkout lane used by the customer.

11. The method as in claim 1, wherein the transaction occurs in a self-checkout lane in the retail environment.

12. The method as in claim 1, wherein the transaction occurs in a manned-checkout lane in the retail environment.

13. The method as in claim 1, wherein the transaction occurs using a mobile checkout device.

14. The method of claim 1 wherein generating the notification to alert retail personnel further includes:
   in the computer system, identifying a grouping of multiple parties including the customer involved in the transaction based on data received from one or more feeds of the monitored data, the grouping including:
   the customer; and
   the store representative facilitating the transaction; and
   in the computer system detecting that the combination or pair including the customer and the store representative are specified in the watch list.

15. A method comprising:
   in a computer system having at least a processor and a memory, monitoring data generated in a retail environment, the monitored data including at least one or more captured video images of a customer during a POS (Point of Sale) transaction occurring in the retail environment;

in the computer system, performing a facial recognition analysis of the one or more video images captured during the POS transaction, to identity the customer and determine whether the identified customer is included in a watch list;

in the computer system, identifying the customer involved in the transaction occurring in the retail environment based on the monitored data, the monitored data including at least facial recognition data obtained from the facial recognition analysis of the customer;

in the computer system, identifying a cashier involved in the transaction;

in the computer system, analyzing the watch list to identify whether a combination of the identified cashier and the identified customer are included in the watch list, the watch list including identities of multiple persons, the identities of the multiple persons included in the watch list based on detection of corresponding suspicious behavior associated with the multiple persons prior to the transaction;

in the computer system, detecting a cart pushout event by identifying video data indicating a cart operated by the customer is leaving or attempting to leave a particular area identified from predetermined areas of the retail environment that are monitored through the at least one or more captured video images, identified by the video data, and wherein the cart comprises at least one item which was not properly recorded during the POS transaction, and wherein the particular area is identified from the predetermined areas comprising: a bypass path used to exit the retail environment by bypassing the checkout lanes, an ingress pathway used to enter the retail establishment with the customer leaving the retail environment through the ingress pathway, inactive checkout lanes having no transaction logs for any on-going transactions, and a POS checkout lane having a POS transaction log for the POS transaction;

in response to detecting that a combination of the identified cashier and the identified customer are both participants in the transaction and that the combination of the identified cashier and the identified customer are included in the watch list as being a suspicious grouping, and responsive to detecting the cart pushout event, in the computer system, generating a notification; and in the computer system, electronically transmitting the notification to alert retail personnel;

prior to the customer exiting the retail environment, in the computer system, transmitting the notification to retail personnel, the notification indicating to the retail personnel that the customer is included on the watch list;

prior to the transaction, in the computer system, producing the watch list to include an identity of the customer based on detecting occurrence of suspicious activity associated with the customer while the customer is in the retail environments; and wherein the notification is generated in a first stage as a preliminary alert, and in the computer system, processing a second stage prior to transmitting the notification that validates the preliminary alert associated with the notification, wherein during the second stage, real-time data feeds produced in the retail environment are provided as first inputs to the second stage and validation results are provided by human validation as second inputs to the second stage, wherein the second inputs represent a validation feedback.

16. A computer-readable hardware storage medium having instructions stored thereon for processing data information, such that the instructions, when executed by at least one processing device, cause the at least one processing device to perform the operations of:

monitoring data generated in a retail environment, the monitored data including at least one or more captured video images of a customer during a POS (Point of Sale) transaction occurring in the retail environment;

performing a facial recognition analysis of the one or more video images captured during the POS transaction, to identity the customer and determine whether the identified customer is included in a watch list;

identifying the customer and a store representative as participants involved in the transaction based on the monitored data, the monitored data including at least facial recognition data obtained from the facial recognition analysis of the customer;

analyzing the watch list to identify whether a combination including the customer and the store representative is are included in the watch list, the watch list including identities of multiple persons, the identities of the multiple persons included in the watch list based on detection of corresponding suspicious behavior associated with the multiple persons prior to the transaction;

detecting a cart pushout event by identifying video data indicating a cart operated by the customer is leaving or attempting to leave a particular area identified from predetermined areas of the retail environment that are monitored through the one or more video images, identified by the video data, and wherein the cart comprises at least one item which was not properly recorded during the POS transaction, and wherein the particular area identified from the predetermined areas comprising: a bypass path used to exit the retail environment by bypassing the checkout lanes, an ingress pathway used to enter the retail establishment with the customer leaving the retail environment through the ingress pathway, inactive checkout lanes having no transaction logs for any on-going transactions, and a POS checkout lane having a POS transaction log for the POS transaction;

responsive to detecting that the combination including the customer and the store representative is specified in the watch list of the retail environment, and responsive to detecting the cart pushout event, generating a notification to alert retail personnel;

electronically transmitting the notification from a computer device, the notification indicating presence of the customer in the retail environment;

prior to the customer exiting the retail environment, transmitting the notification to retail personnel, the notification indicating to the retail personnel that the customer is included on the watch list;

prior to the transaction, producing the watch list to include an identity of the customer based on detecting occurrence of suspicious activity associated with the customer while the customer is in the retail environments; and wherein the notification is generated in a first stage as a preliminary alert, and processing a second stage prior to transmitting the notification that validates the preliminary alert associated with the notification, wherein during the second stage, real-time data feeds produced in the retail environment are provided as first inputs to the second stage and validation results are provided by human validation as second inputs to the second stage, wherein the second inputs represent a validation feedback.

17. A system comprising:
at least one processor device;
a storage resource that stores instructions associated with an application executed by the at least one processor device; and
an interconnect coupling the at least one processor device and the storage resource, the at least one processor device executing the application and performing operations of:
monitoring data generated in a retail environment, the monitored data including at least one or more captured video images of a customer during a POS (Point of Sale) transaction occurring in the retail environment;
performing a facial recognition analysis of the one or more video images captured during the POS transaction, to identity the customer and determine whether the identified customer is included in a watch list;
identifying the customer and a store representative as participants involved in the transaction occurring in the retail environment based on the monitored data, the monitored data including at least facial recognition data obtained from the facial recognition analysis of the customer;
analyzing the watch list to identify whether a combination including the customer and store representative is are included in the watch list, the watch list including identities of multiple persons, the identities of the multiple persons included in the watch list based on detection of corresponding suspicious behavior associated with the multiple persons prior to the transaction;
identifying a grouping of multiple parties including the customer involved in the transaction based on data received from one or more feeds of the monitored data, the grouping including:
the customer; and
a store representative facilitating the transaction;
detecting that the combination or pair including the customer and the store representative are specified in the watch list;
detecting a cart pushout event by identifying video data indicating a cart operated by the customer is leaving or attempting to leave a particular area identified from predetermined areas of the retail environment that are monitored through the one or more video images, identified by the video data, and wherein the cart comprises at least one item which was not properly recorded during the POS transaction, and wherein detecting further includes monitoring the particular area identified from the predetermined areas that comprise: a bypass path used to exit the retail environment by bypassing the checkout lanes, an ingress pathway used to enter the retail establishment with the customer leaving the retail environment through the ingress pathway, inactive checkout lanes having no transaction logs for any on-going transactions, and a POS checkout lane having a POS transaction log for the POS transaction;
responsive to detecting that the combination including the customer and the store representative is specified in the watch list of the retail environment, and responsive to detecting the cart pushout event, generating a notification to alert retail personnel; and
electronically transmitting the notification from a computer device, the notification indicating presence of the customer in the retail environment; and
prior to the customer exiting the retail environment, transmitting the notification to retail personnel, the notification indicating to the retail personnel that the customer is included on the watch list;
prior to the transaction, producing the watch list to include an identity of the customer based on detecting occurrence of suspicious activity associated with the customer while the customer is in the retail environment; and
wherein the notification is generated in a first stage as a preliminary alert, and processing a second stage prior to transmitting the notification that validates the preliminary alert associated with the notification, wherein during the second stage, real-time data feeds produced in the retail environment are provided as first inputs to the second stage and validation results are provided by human validation as second inputs to the second stage, wherein the second inputs represent a validation feedback.

\* \* \* \* \*